US009860194B1

(12) United States Patent
Cooper et al.

(10) Patent No.: US 9,860,194 B1
(45) Date of Patent: Jan. 2, 2018

(54) RESOURCE MANAGEMENT METHODS AND APPARATUS

(71) Applicant: ACCUSOFT CORPORATION, Tampa, FL (US)

(72) Inventors: Adam J. Cooper, Seffner, FL (US); Garland S. Taylor, Valrico, FL (US); Stephen C. Brooks, Sparta, NC (US)

(73) Assignee: Accusoft Corporation, Tampa, FL (US)

( * ) Notice: Subject to any disclaimer, the term of this patent is extended or adjusted under 35 U.S.C. 154(b) by 244 days.

(21) Appl. No.: 14/925,854

(22) Filed: Oct. 28, 2015

(51) Int. Cl.
*G06F 15/173* (2006.01)
*H04L 12/911* (2013.01)

(52) U.S. Cl.
CPC .................................. *H04L 47/826* (2013.01)

(58) Field of Classification Search
USPC ....... 709/203, 206, 217, 219, 223, 224, 226, 709/228, 231, 232, 238; 707/704; 705/38; 711/153; 455/446; 370/400
See application file for complete search history.

(56) References Cited

U.S. PATENT DOCUMENTS

| | | | | |
|---|---|---|---|---|
| 9,619,507 B2 * | 4/2017 | Chang | ............... | G06F 17/30371 |
| 2003/0216953 A1 * | 11/2003 | Dawson | ................. | G06Q 10/06 455/446 |
| 2008/0183975 A1 * | 7/2008 | Foster | ................. | G06F 11/1076 711/153 |
| 2010/0202462 A1 * | 8/2010 | Riddel | ................ | H04L 12/2801 370/400 |
| 2013/0060742 A1 * | 3/2013 | Chang | ............... | G06F 17/30359 707/704 |
| 2015/0120527 A1 * | 4/2015 | He | ........................ | G06Q 40/025 705/38 |
| 2017/0109394 A1 * | 4/2017 | Chang | ............... | G06F 17/30353 |

\* cited by examiner

*Primary Examiner* — Quang N Nguyen
(74) *Attorney, Agent, or Firm* — Straub & Straub; Michael P. Straub; Stephen T. Straub

(57) ABSTRACT

Methods and apparatus for managing resource utilization in a distributed system are described. Devices, e.g., servers, which use resources, e.g., processing cores, act as individual policy enforcement points. Individual servers retrieve and maintain local copies of resource lease records which are stored in a centralized data storage system. The individual server compares locally stored lease records to the retrieved lease records to check for any tampering in the centralized data storage and multiple states are supported to take into consideration transitory conditions and/or communications delays. Verification states include, e.g., a Pending Active state and a Pending Inactive State, in addition to an Active state and Inactive state, to delay licensing enforcement to account for centralized storage system eventual consistency delays.

18 Claims, 13 Drawing Sheets

RESOURCE MANAGEMENT METHODS AND APPARATUS

FIELD

The present application relates to resource utilization and, more particularly, to methods and apparatus for monitoring resource utilization and/or enforcing resource utilization polices in a distributed environment where different devices may independently utilize resources subject to resource utilization and reporting constraints.

BACKGROUND

In many systems the total amount of resources which are available is limited with some or all of the resources being shared between multiple users. Examples of such systems including cloud computing environments and communications systems. In the case of cloud computing systems the shared resources which are available may be processing cores executing a particular application or supporting a particular hardware function. In the case of communications systems the resources may be wireless bandwidth which can be used by multiple devices but which to be useful should be shared in a manner which allows multiple devices to use portions of the shared resource in a manner that does not totally block or preclude at least some other users to use some of the limited resource, e.g., bandwidth.

In systems where resource user's may be responsible for implementing at least a portion of resource utilization policies and reporting resource utilization to a centralized authority or register which may then reallocate or authorize use of different amounts of the limited resource by different devices, there is a need to take into consideration communication delays and the possibility that some resource utilization messages may be dropped or lost. Thus, despite efforts of devices to report resource utilization information and/or renew or obtain authorization for future use of resources, communications errors may result in centralized storage of reported resource utilization information being inaccurate or incomplete due to unintentional communications errors or message delays.

Resource utilization information which is used to authorize use of resources by individual devices may also be inaccurate due to intentional fraud. For example, a user of a device may intentionally interfere with the communication of a resource utilization message so that the user can obtain unauthorized access to a resource and/or avoid compensating the resource owner for access to the resource. In addition to interfering with the communication of a resource utilization message, a user may attempt to delete a resource utilization message from a storage site used to hold such messages and/or information.

While intentional interference with the communication or storage of resource utilization information may be appealing to the fraudulent individual seeking to obtain access to the limited resources that are available, unauthorized use of the limited resources may degrade system performance and/or functionally provided to authorized users who where expecting to be able to use the limited resources since the authorized users maybe denied access to the resources.

From a technical perspective it might seem that a useful approach to the above described technical problems of loss of messages communicating resource utilization information, transmission delays of resource utilization information reports and/or possible corruption or tampering with stored resource utilization information would be to improve the reliability and/or security of the communications and/or storage system used to communicate resource information, the communications network and/or storage system might not be owned or managed by the entity attempting to manage and control utilization of the limited resources, e.g., processing and/or bandwidth resources.

In view of the above discussion, it should be appreciated that there is a need for improved methods and/or apparatus for managing resource utilization in systems where reported resource information may be delayed and/or partially unreliable for a variety of reasons.

SUMMARY

Various features address technical problems associated with using a communications network which may subject messages and/or communications to delays which may result in information stored in a centralized storage device being out of date unreliable. Various other features address the problem of lack of security that may be associated with using a centralized storage device accessible to multiple devices with read/write capability and which may alter or delete information stored in the centralized storage device.

Methods and apparatus for managing resource utilization in a distributed system are described. Devices which use resources, e.g., servers, act as individual policy enforcement points. An entity, such as an individual or business, may contract for the right to use a particular amount of resources, e.g., processor cores, for a particular operation. The distributed system normally includes more resources, e.g., processor cores, than an individual entity is entitled to use at any given time.

Resources may be used at different locations, e.g., at different servers. To keep track of resource utilization, devices such as servers using the limited resources are required to report resource utilization by way of storing lease information in a commonly accessible storage device coupled to the device using the resources by a communications network. For example, multiple processors, each of which may use resources, e.g., processor cores, report their resource utilization by writing lease records to a commonly accessible, e.g., central, storage device. In some embodiments the central storage device is a cloud based data storage system accessible to the devices using resources via a communications network. Via the communications network devices using resources can both write and read leases to the centralized storage device. Unfortunately, the devices using the resources can, in some embodiments, also alter or delete lease information written to the centralized storage device. Thus, while a resource provider may require a server operator to execute software provided for purposes of allowing the server to use the available resources and which writes and reads lease information to the centralized database, a user of the server may also use another application to alter or delete the lease information written to the centralized data storage device.

In order to address the risk of tampering with or deletion of lease records in the centralized storage device used to store lease records, which are used by individual devices to make decisions with regard to whether or not they are allowed to use resources, in various embodiments local storage of lease records is supported in addition to centralized lease records. In some embodiments prior to writing a new lease record, a device reads lease records previously stored in the central storage device and then compares the retrieved records with the locally stored lease records. If record alteration is detected, the device may and normally will enter a tampering detected state and send an alert reporting the tampering, e.g. an Email reporting the detected altered lease record, to the resource provider. The resource provider or administrator system may then take action to stop the tampering, e.g., automatically in some embodiments.

While detection of an altered record may be a clear indication of tampering, there are cases where a missing lease record may be the result of communications delays and/or a delay associated with the central storage device making a recently written record available for reading.

In order to address the possibility that a lease record is not available due to a legitimate problem or lease records being out of date due to communications delays, in addition to an active state of operation and an inactive state of operation, a variety of additional states of operation are supported. In one embodiment in addition to inactive and active states of operation, pending inactive and pending active states are supported. In some embodiments a tampering detected state of operation is also supported.

During pending inactive and pending active states, a device is allowed to continue leasing and using resources even though it is unclear if the device is entitled to use such resources. Such an approach favors the user of resources and avoids disruptions which may be due to transient or legitimate system delays or communications issues. During the pending inactive and pending active states, various checks are made which are intended to resolve uncertainty with respect to the right to use resources which may be due to legitimate communications and/or system delays.

Over time, assuming no fraud, the information in the central storage device will come to accurately reflect past license information. As this occurs, a device may transition out of the pending inactive state or pending active state to another state. At any time intentional alteration of a license record corresponding to the entity seeking the right to use resources is detected, the device seeking to use resources on behalf of the entity will transition to the tampering detected state and deny the use of additional resources to the entity associated with the detected tampering.

By controlling transitions between states operation with at least some of the states being intended to take into consideration expected communications and/or other system delays, resources can be provided to a party, e.g., user, corresponding to an entity which licenses for the right to use resources while still addressing the risk that someone may intentionally delete or alter lease records reporting resource utilization.

An exemplary method of operating a first device, e.g., server, to control resource utilization by the first device, in accordance with some embodiments, includes: determine a number resources, e.g., number of cores, to be used by the first device; write a first lease record to local storage; write the first lease record to a central storage device; operate in an active state in which one or more leased resources are used; and while operating in the active state: i) retrieving a first set of non-expired lease records from central storage device; and ii) comparing one or more lease records in the retrieved first set of non-expired lease records to locally stored lease record information to determine if any of the retrieved lease records for which a local copy exists were altered.

Numerous additional features, embodiments and benefits of the various embodiments are discussed in the detailed description which follows. While various embodiments have been discussed in the summary above, it should be appreciated that not necessarily all embodiments include the same features and some of the features described above are not necessary but can be desirable in some embodiments.

DETAILED DESCRIPTION

Figure 1:
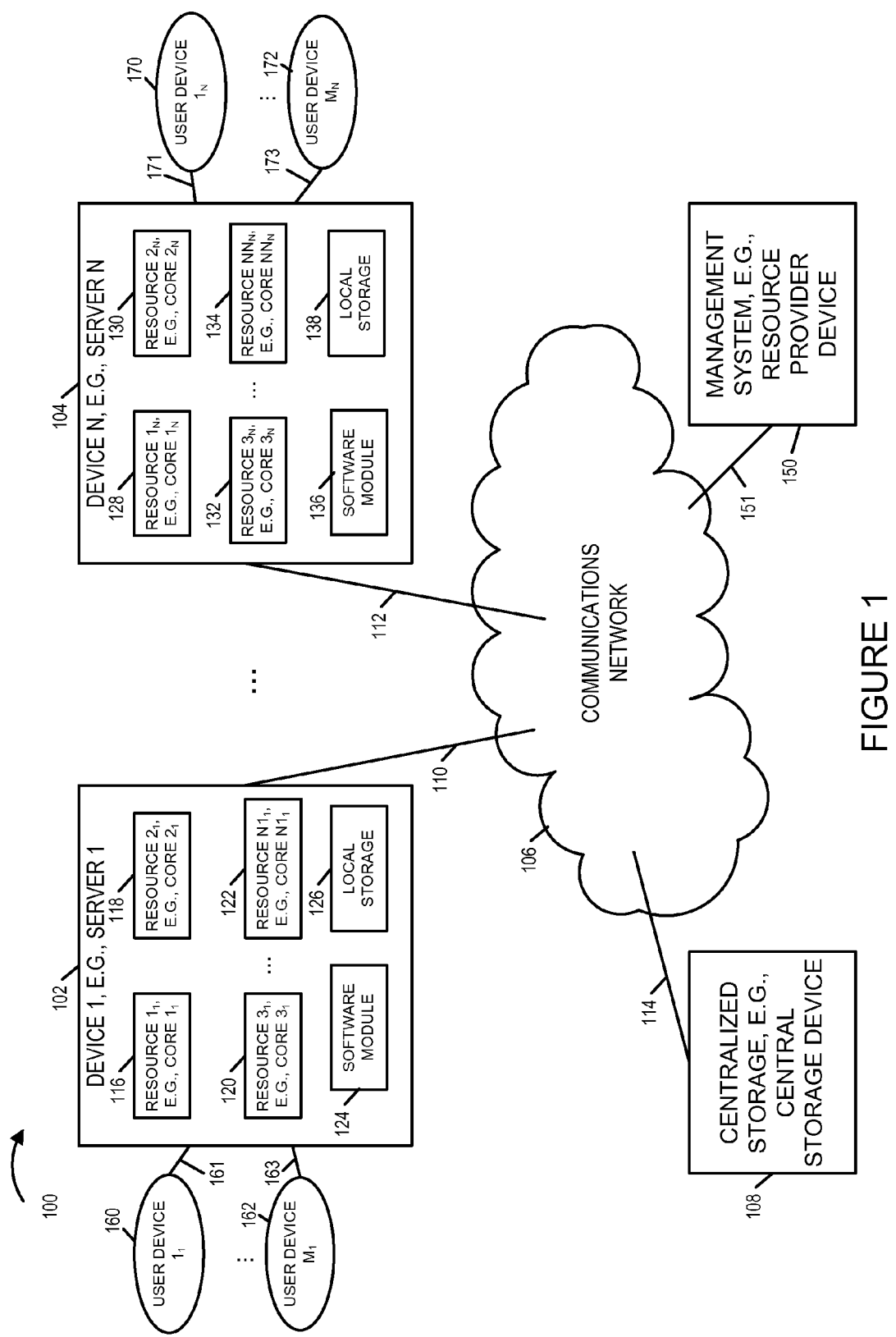
FIG. 1 is a drawing of an exemplary system in accordance with an exemplary embodiment.

FIG. 1 is a drawing of an exemplary system 100 in accordance with various exemplary embodiments. System 100 includes a plurality of devices, e.g., servers, (device 1 102, e.g., server 1, . . . , device N 104, e.g., server N), centralized storage 108, e.g., a central storage device, and a management system 150, e.g., a resource provider device 150, and a communications network 106. The various devices or systems (102, . . . , 104, 108, 150) are coupled to the communications network 106 via links (110, . . . , 112, 114, 151), respectively.

Exemplary system 100 further includes a plurality of user devices (user device $1_1$ 160, . . . , user device $M_1$ 162) coupled to device 1 102, e.g., server 1, via links (161, . . . , 163), respectively. Exemplary system 100 further includes a plurality of user devices (user device $1_N$ 170, . . . , user device $M_N$ 172) coupled to device N 104, e.g., server N, via links (171, . . . , 173), respectively.

Device 1 102, e.g., server 1, includes a plurality of resources (resource $1_1$ 116, e.g., core $1_1$, resource $2_1$ 118, e.g., core $2_1$, resource $3_1$ 120, e.g., core $3_1$, . . . , resource $N1_1$ 122, e.g., core $N_1$), a software module 124, and local storage 126. Device N 104, e.g., server N, includes a plurality of resources (resource $1_N$ 128, e.g., core $1_N$, resource $2_N$ 130, e.g., core $2_N$, resource $3_N$ 132, e.g., core $3_N$, . . . , resource $NN_N$ 134, e.g., core $NN_N$), a software module 136, and local storage 138.

Figure 2:
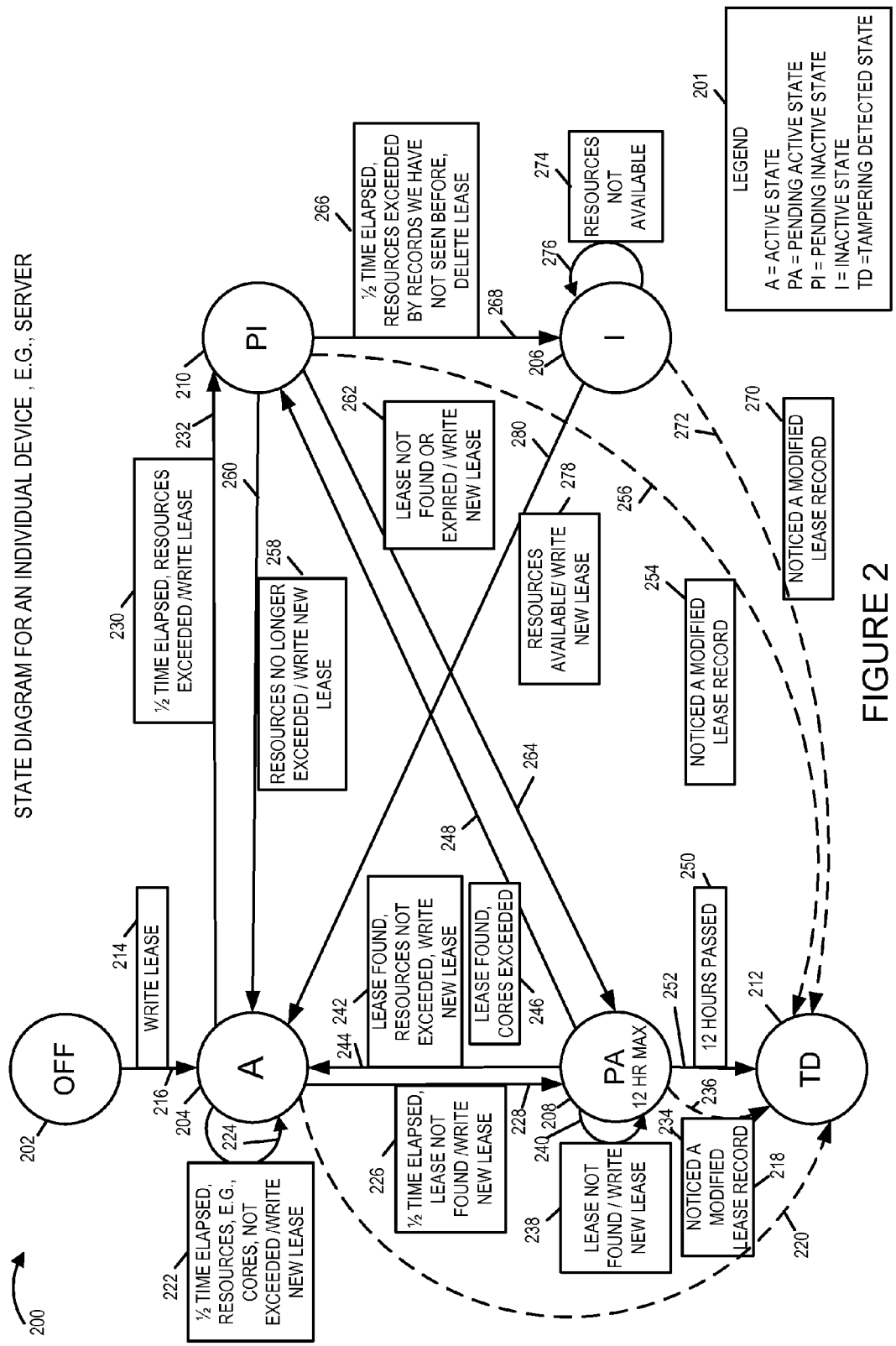
FIG. 2 is a drawing of a state diagram for an exemplary device, e.g., a server, in accordance with an exemplary embodiment.
Figure 3A:
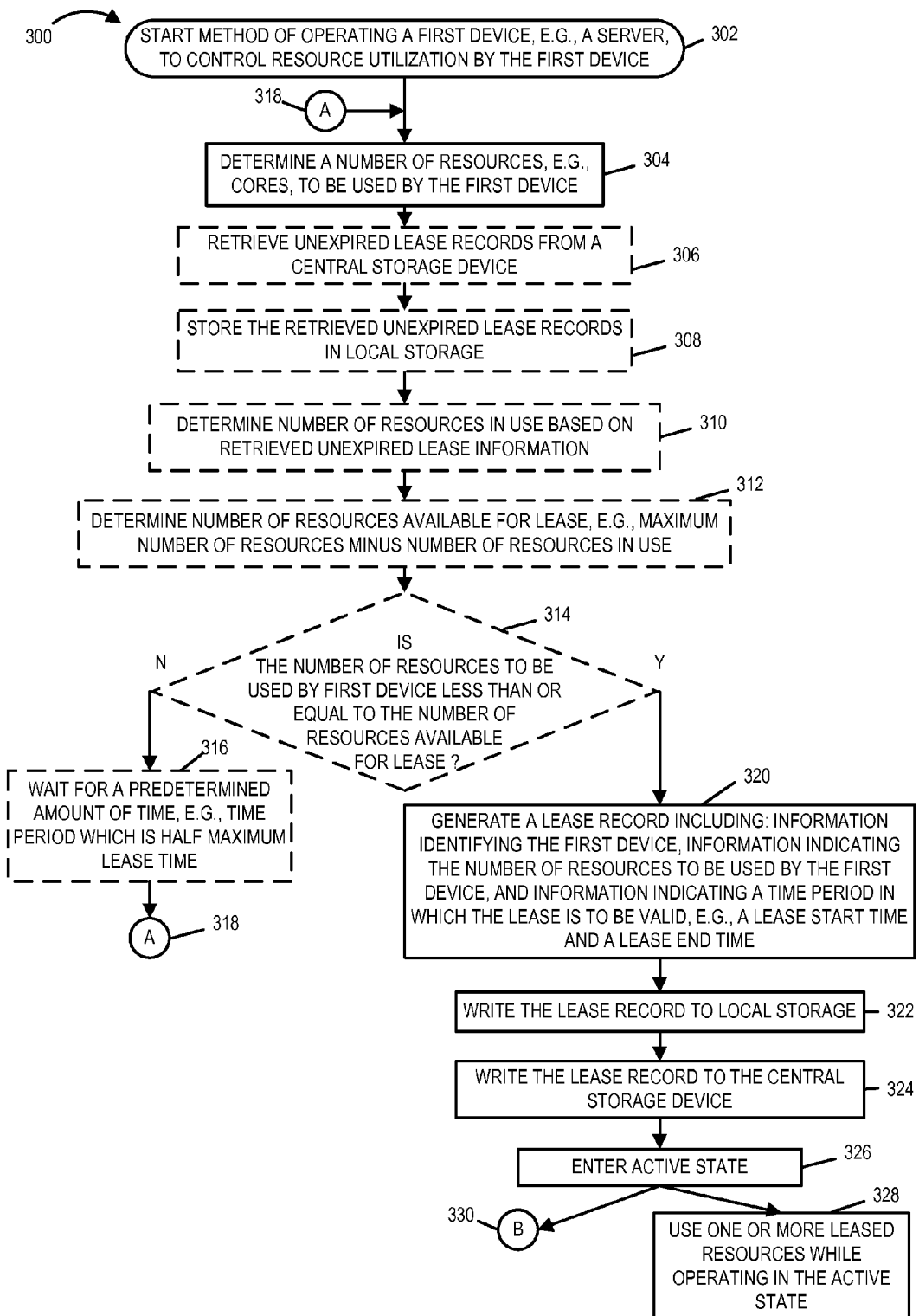
FIG. 3A is a first part of a flowchart of an exemplary method of operating a device, e.g., server, in accordance with an exemplary embodiment.
Figure 3B:
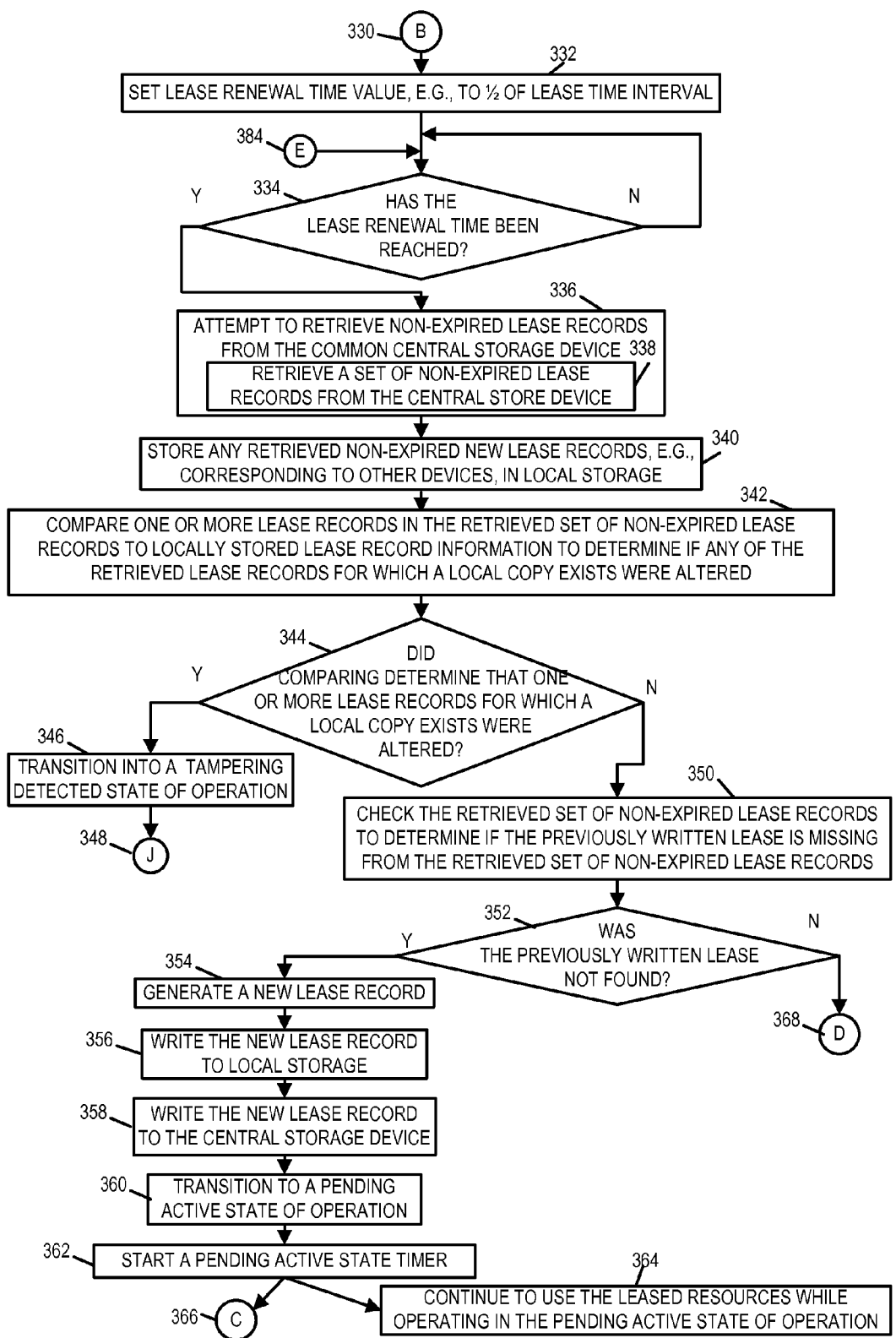
FIG. 3B is a second part of a flowchart of an exemplary method of operating a device, e.g., server, in accordance with an exemplary embodiment.
Figure 3C:
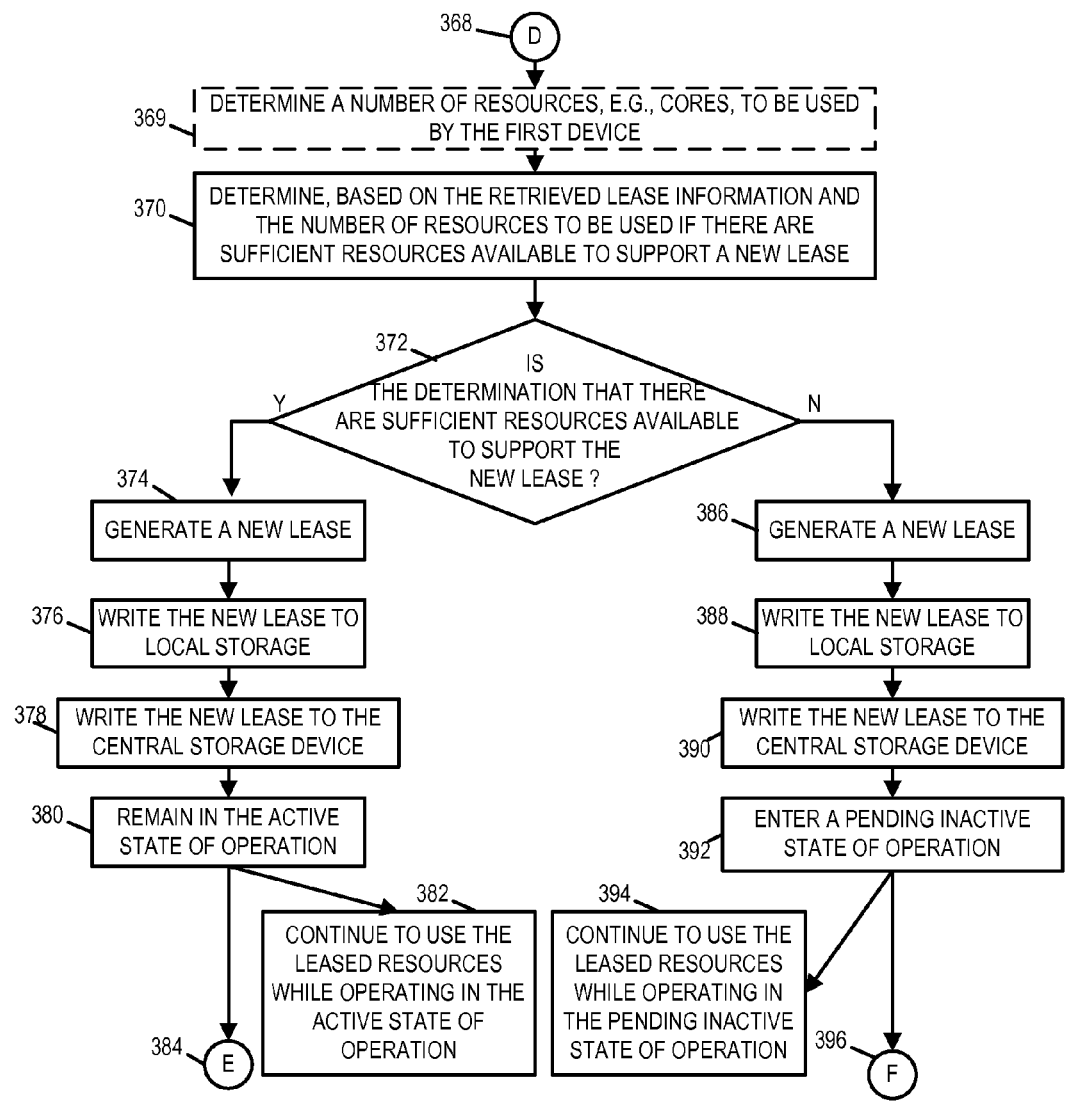
FIG. 3C is a third part of a flowchart of an exemplary method of operating a device, e.g., server, in accordance with an exemplary embodiment.
Figure 3D:
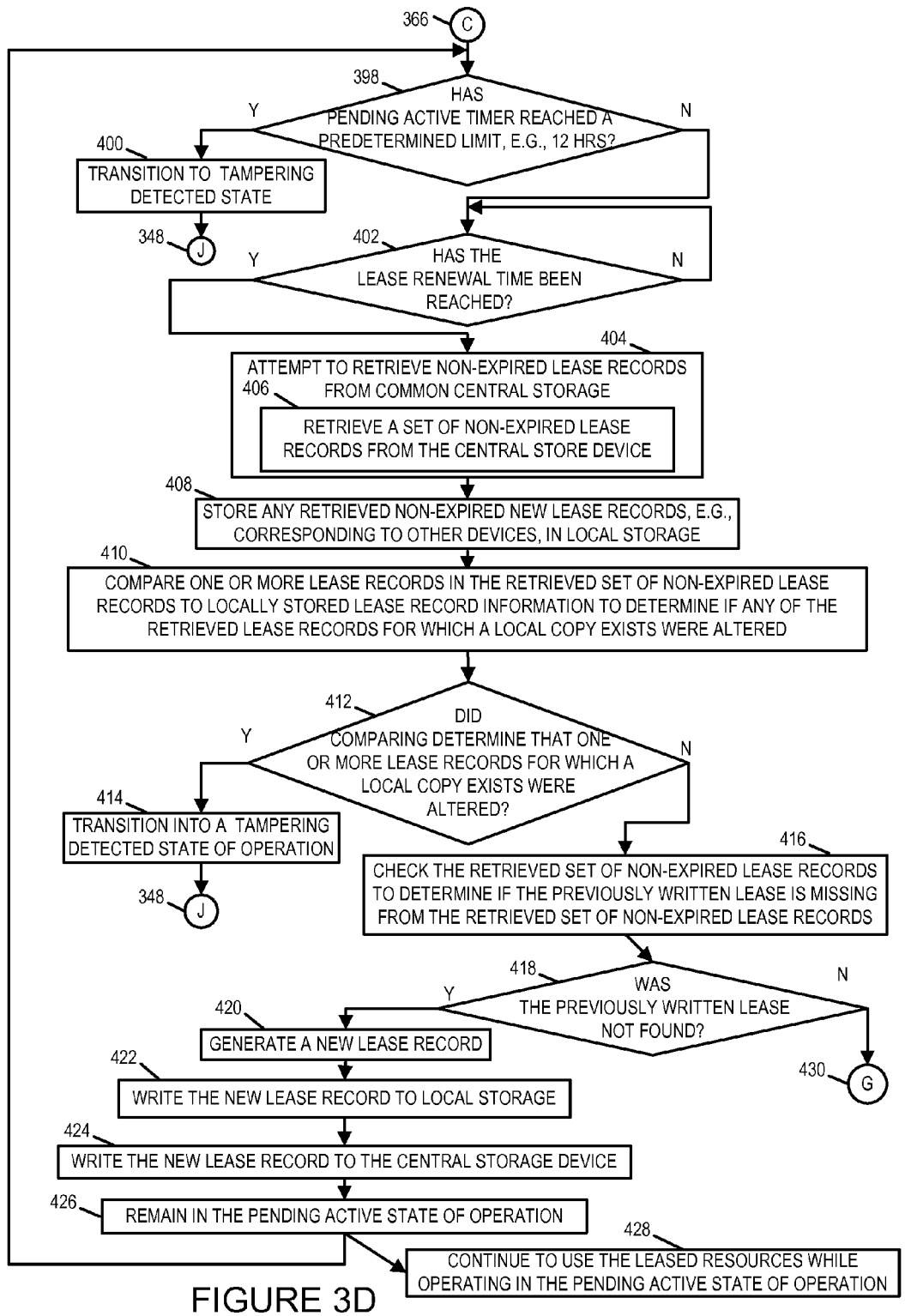
FIG. 3D is a fourth part of a flowchart of an exemplary method of operating a device, e.g., server, in accordance with an exemplary embodiment.
Figure 3E:
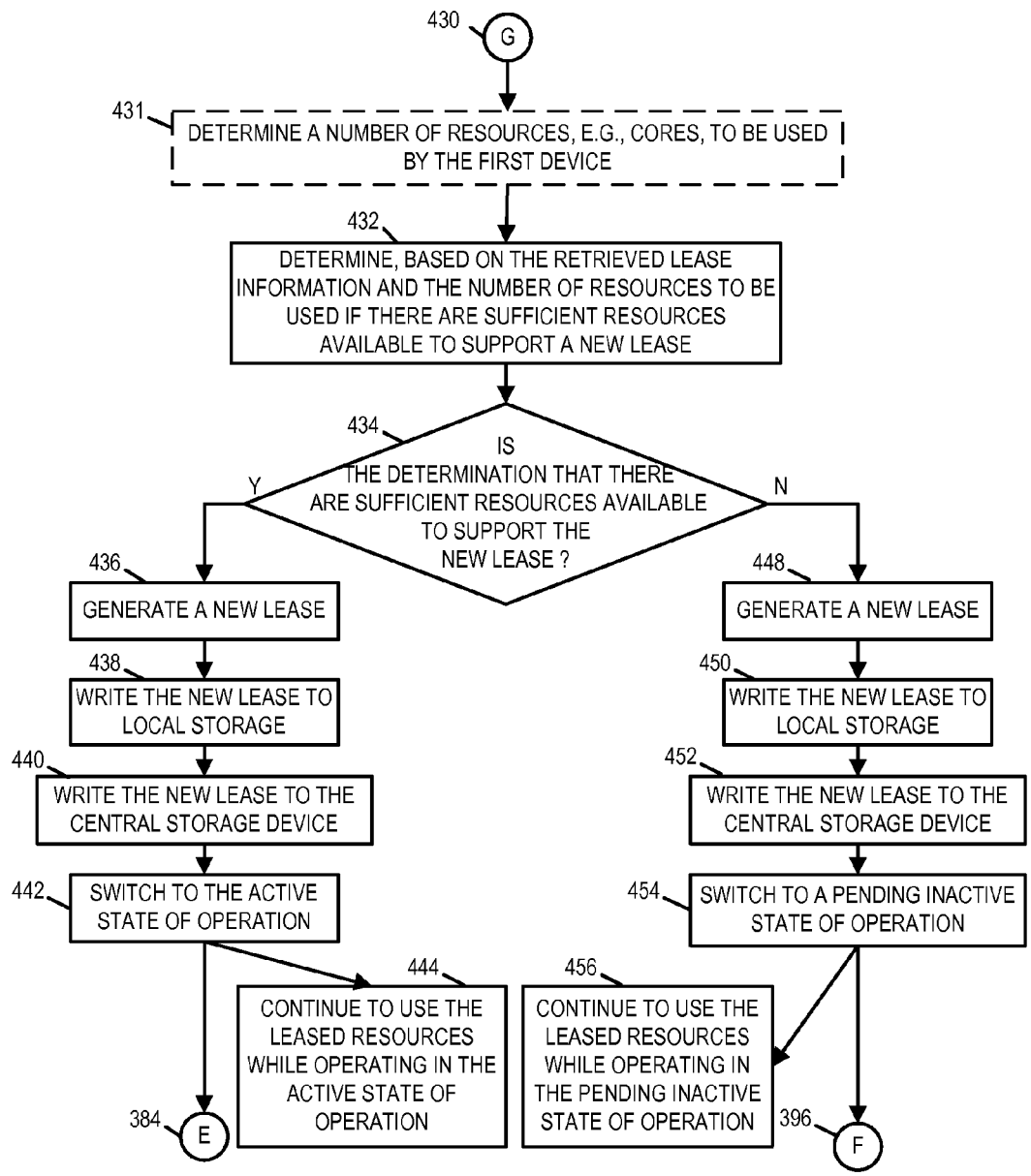
FIG. 3E is a fifth part of a flowchart of an exemplary method of operating a device, e.g., server, in accordance with an exemplary embodiment.
Figure 3F:
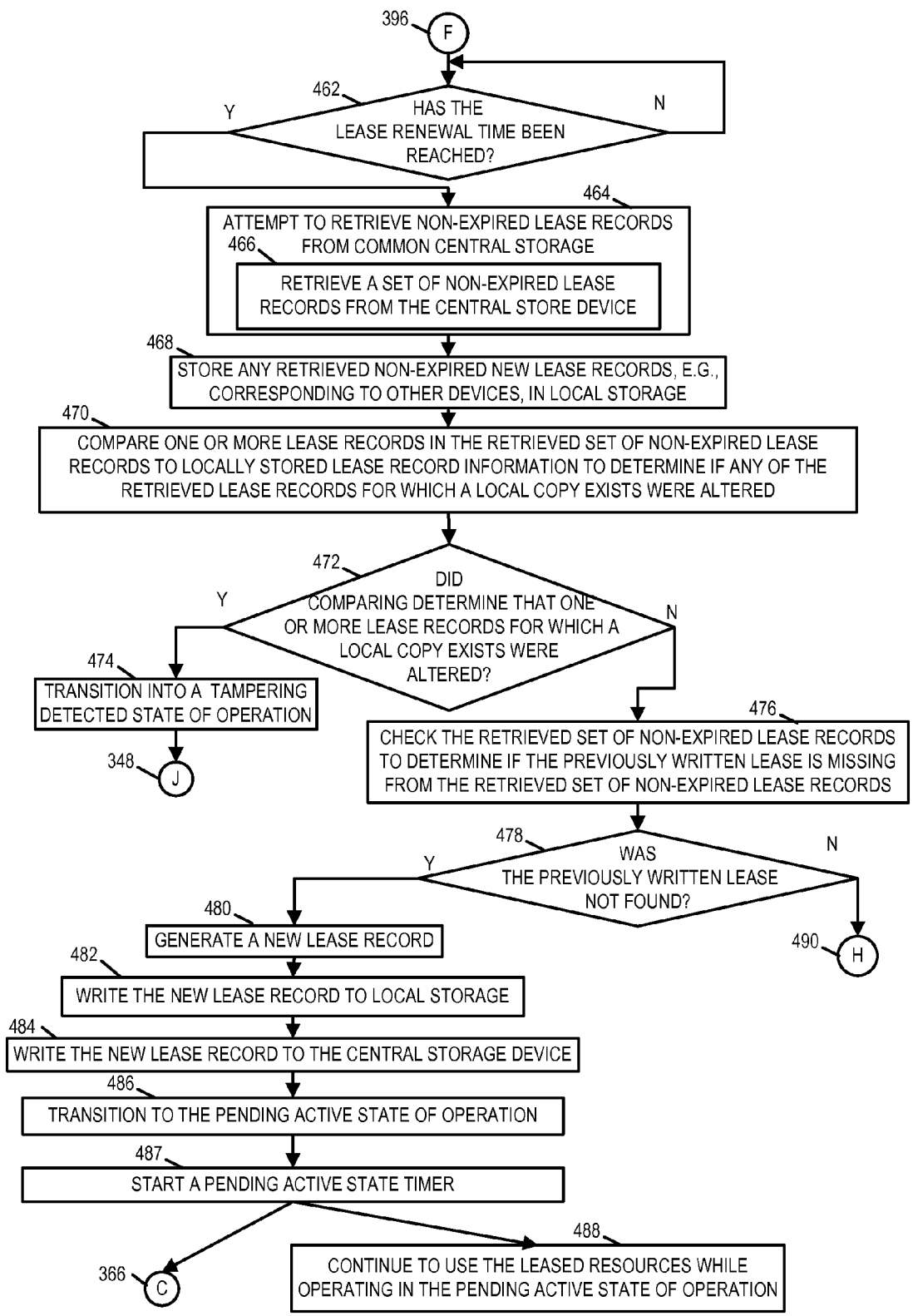
FIG. 3F is a sixth part of a flowchart of an exemplary method of operating a device, e.g., server, in accordance with an exemplary embodiment.
Figure 3G:
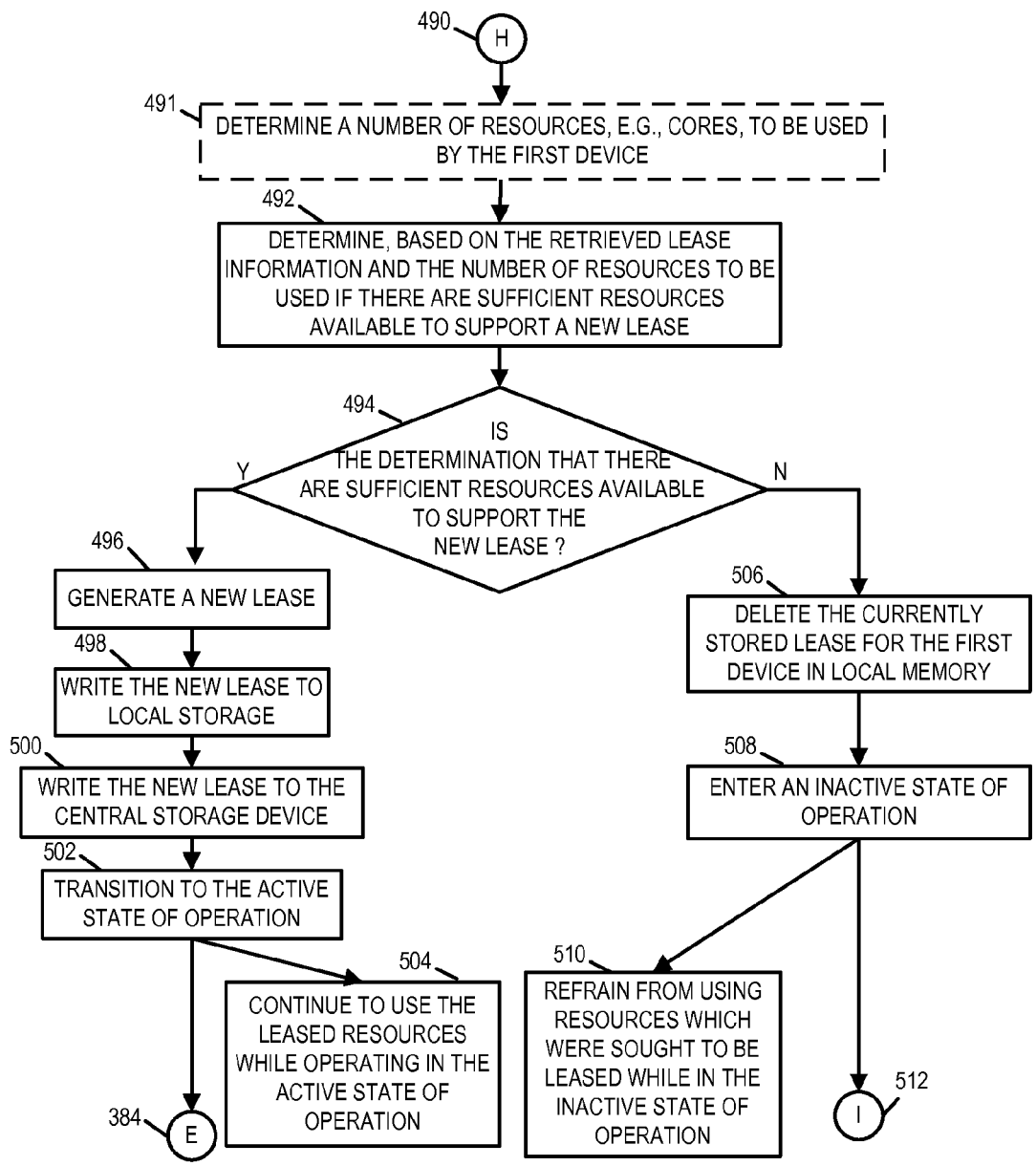
FIG. 3G is a seventh part of a flowchart of an exemplary method of operating a device, e.g., server, in accordance with an exemplary embodiment.
Figure 3H:
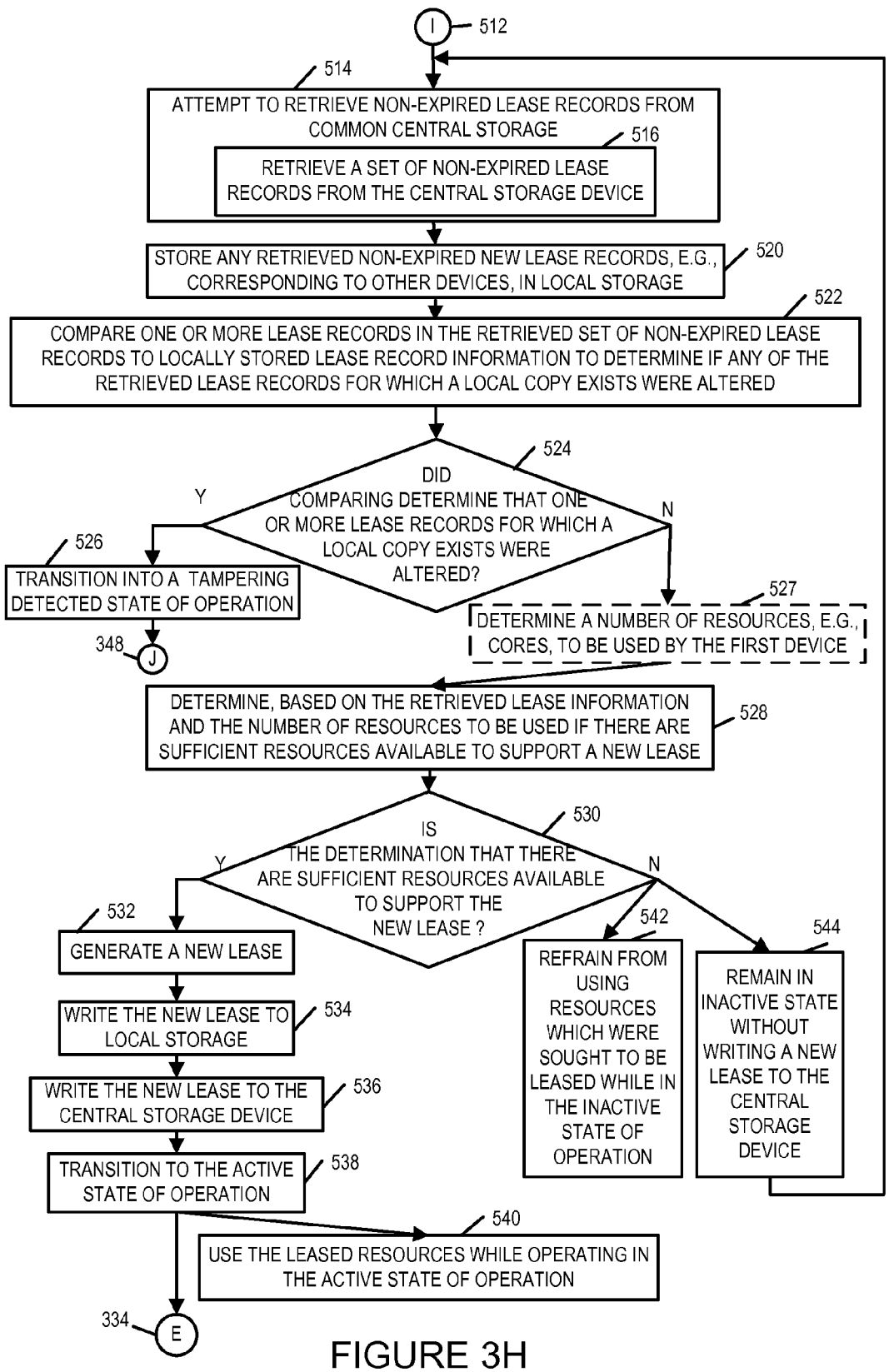
FIG. 3H is an eighth part of a flowchart of an exemplary method of operating a device, e.g., server, in accordance with an exemplary embodiment.
Figure 3J:
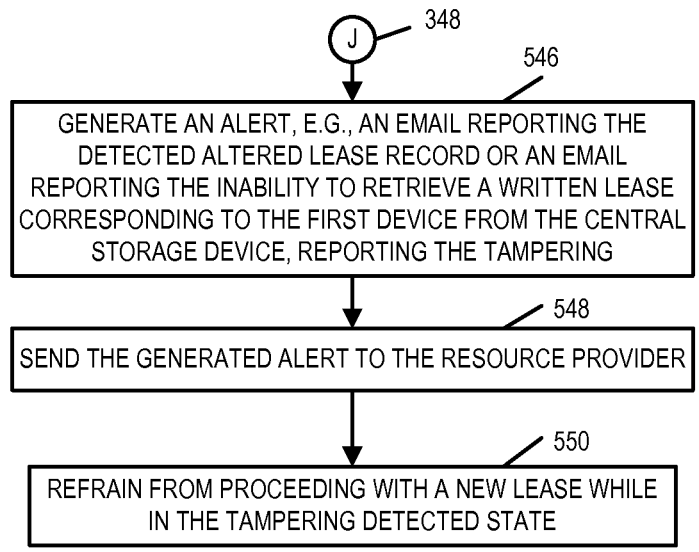
FIG. 3J is a ninth part of a flowchart of an exemplary method of operating a device, e.g., server, in accordance with an exemplary embodiment.
Figure 3:
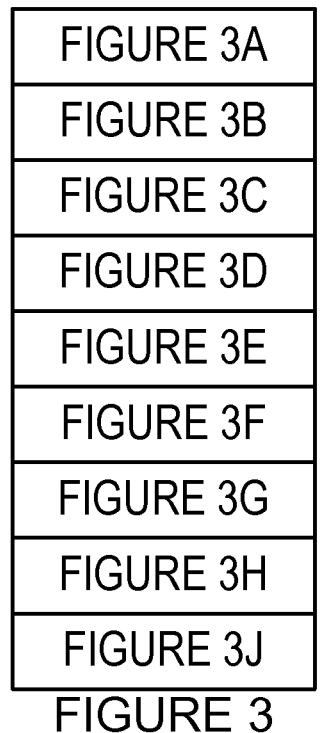
FIG. 3 comprises the combination of FIG. 3A, FIG. 3B, FIG. 3C, FIG. 3D, FIG. 3E, FIG. 3F, FIG. 3G, FIG. 3H and FIG. 3J.

In various embodiments, one or more of devices (102, . . . 104), e.g., a plurality servers, each implement a method in accordance with flowchart 300 of FIG. 3 and/or state diagram 200 of FIG. 2. Software modules (124, . . . , 126) include code used to implement the method of flowchart 300 of FIG. 3 and/or the state diagram of FIG. 2. Local storage 126, local storage 138 and centralized storage 108 include lease records.

Devices (102, . . . , 104), e.g., servers, which use resources, act as individual policy enforcement points. An entity, such as an individual or business, may contact for the right to use a particular number of resources, e.g., processor cores, for a particular operation. The distributed system 100 normally includes more resources, e.g., processor cores than an individual entity is entitled to use at a given time. Resources may be used at different location, e.g., at different servers. To keep track of resource utilization, devices such as servers using the limited resources are required to report resource utilization by way of storing lease information in a commonly accessible storage device, e.g., device 108, which is coupled to the devices using the resources via communications network 106.

In some embodiments the central storage device 108 is a cloud based data storage system accessible to the devices (102, . . . , 104) using resources via a communications network 106. Via the communications network 106, devices (102, . . . , 104) using resources can both write and read leases to the centralized storage device 108. Unfortunately, the devices (102, . . . , 104) using the resources can, in some embodiments, also alter or delete lease information written to the centralized storage device 108. Thus, while a resource provider 150 may require a server operator to execute software provided for purposes of allowing the server to use the available resources and which writes and reads lease information to the centralized database 108, a user of the server may also use another application to alter or delete the lease information written to the centralized data storage device 108.

In order to address the risk of tampering with or deletion of lease records in the centralized storage device 108 used to store lease records, which are used by individual devices (102, . . . , 104) to make decisions with regard to whether or not they are allowed to use resources, in various embodiments local storage of lease records is supported, e.g., (local storage 126, . . . , local storage 138), in addition to centralized lease records. In some embodiments prior to writing a new lease record, a device, e.g., device 102, reads lease records previously stored in the central storage device 108 and then compares the retrieved records with the locally stored lease records. If record alteration is detected, the device, e.g., device 102, may and normally will enter a tampering detected state and send an alert reporting the tampering, e.g. an Email reporting the detected altered lease record, to the resource provider 150. The resource provider or administrator system 150 may then take action to stop the tampering, e.g., automatically in some embodiments.

While detection of an altered record may be a clear indication of tampering, there are cases where a missing lease record may be the result of communications delays and/or a delay associated with the central storage device 108 making a recently written record available for reading.

In order to address the possibility that a lease record is not available due to a legitimate problem or lease records being out of date due to communications delays, in addition to an active state of operation and an inactive state of operation, a variety of additional states of operation are supported. In one embodiment in addition to inactive and active states of operation, pending inactive and pending active states are supported. In some embodiments a tampering detected state of operation is also supported.

During pending inactive and pending active states, a device, e.g., device 102, is allowed to continue leasing and using resources even though it is unclear if the device, e.g., device 102, is entitled to use such resources. Such an approach favors the user of resources and avoids disruptions which may be due to transient or legitimate system delays or communications issues. During the pending inactive and pending active states, various checks are made which are intended to resolve uncertainty with respect to the right to use resources which may be due to legitimate communications and/or system delays.

Over time, assuming no fraud, the information in the central storage device 108 will come to accurately reflect past license information. As this occurs, a device, e.g., device 102, may transition out of the pending inactive state or pending active state to another state. At any time intentional alteration of a license record corresponding to the entity seeking the right to use resources is detected, the device, e.g., device 102, seeking to use resources on behalf of the entity will transition to the tampering detected state and deny the use of additional resources to the entity associated with the detected tampering.

By controlling transitions between states operation with at least some of the states being intended to take into consideration expected communications and/or other system delays, resources can be provided to a party, e.g., user, corresponding to an entity which licenses for the right to use resources while still addressing the risk that someone may intentionally delete or alter lease records reporting resource utilization.

FIG. 2 is a drawing 200 of a state diagram for an individual device, e.g., a server, in accordance with an exemplary embodiment. State diagram 200 is, e.g., for device 102 of system 100 of FIG. 1; and the device may be in different states at different times, the different states including: Off state 202; Active state 204; Pending Active state 208; Pending Inactive state 210; Inactive state 206; and Tampering Detected state 212. Legend 201 indicates that A=active state; PA=Pending Active state; PI=Pending Inactive state; I=Inactive state; and TD=Tampering Detected state.

A device in OFF state 202 determines a number of resources, e.g., cores, to be used by the device, and generates and writes a lease record for the resources, as indicated by box 214. The lease record is written to both local storage and a centralized storage device. The lease has a lease time interval, e.g. 5 minutes. The device transitions to the Active state 204, as indicated by arrow 216. In active state the device uses the leased resources.

Various scenarios will now be described regarding state transitions from active state 204. While in active state 204, after half of the duration of the lease time interval has elapsed, e.g., after 2.5 minutes, the device attempts to read a set of lease records from the central storage device. If the lease which was previously written was not found, e.g., the previously written lease was not in the retrieved set of records from the centralized storage device or the centralized storage device is not responding to requests for lease records, then the device generates and writes a new lease to both local and centralized storage, as indicated by block 226, and the device transitions to the pending active state 208, as indicated by arrow 228. In the pending active state 208 the device continues to use leased resources.

Alternatively, if the previously written lease was found in the retrieved lease records from the centralized storage device and the device determines that resources are not exceeded, e.g., based on retrieved lease records of other devices, the number of resources intended to be used by the device in the new lease, and the total number of resources available to be leased, e.g., by an entity in accordance with a contract, the device writes a new lease record to local and centralized storage as indicated by block 222, and the device remains in the active state as indicated by arrow 224.

Alternatively, if the previously written lease was found in the retrieved lease records from the centralized storage device and the device determines that resources are exceeded, e.g., based on retrieved lease records of other devices, the number of resources intended to be used by the device in the new lease, and the total number of resources available to be leased, e.g., by an entity in accordance with a contract, the device writes a new lease record to local and centralized storage as indicated by block 230, and the device transitions into the pending inactive state 210 as indicated by arrow 232. In the pending inactive state 210 the device continues to use leased resources.

Alternatively, if the device notices a modified lease record in the retrieved lease records from centralized storage, e.g., a lease record retrieved from centralized storage does not match a lease record which was previously stored in local storage of the device, as indicated by block 218, the device transitions to tampering detected state 212, as indicated by arrow 220.

Various scenarios will now be described regarding state transitions from the pending inactive state 210. While in the pending inactive state 210, after half of the duration of the lease time interval has elapsed, e.g., after 2.5 minutes, the device attempts to read a set of lease records from the central storage device. If the lease which was previously written was not found, e.g., the previously written lease was not in the retrieved set of records from the centralized storage device or the centralized storage device is not responding to requests for lease records, or expired, then the device generates and writes a new lease to both local and centralized storage, as indicated by block 262, and the device transitions to the pending active state 208, as indicated by arrow 264. In various embodiments, the transition from the pending inactive state to pending active state should be extremely rare. In some such embodiments, for it to occur, no leases expire and no new leases are written. The only way this can occur is if two or more machines have written leases with exactly the same expiration time and there are no other machines with a different expiration time. In the pending active state 208 the device continues to use leased resources.

Alternatively, if the previously written lease was found in the retrieved lease records from the centralized storage device and the device determines that resources are no longer exceeded, e.g., based on retrieved lease records of other devices, the number of resources intended to be used by the device in the new lease, and the total number of resources available to be leased, e.g., by an entity in accordance with a contract, the device writes a new lease record to local and centralized storage as indicated by block 258, and the device transitions into the active state as indicated by arrow 256.

Alternatively, if the previously written lease was found in the retrieved lease records from the centralized storage device and the device determines that resources are exceeded, e.g., based on retrieved lease records of other devices which have not been seen before, the number of resources intended to be used by the device in the new lease, and the total number of resources available to be leased, e.g., by an entity in accordance with a contract, the device deletes the lease, as indicated by block 266, and the device transitions into the inactive state 206 as indicated by arrow 268. In the inactive state 206 the device refrains from using the resources that it had previously sought to be leased.

Alternatively, if the device notices a modified lease record in the retrieved lease records from centralized storage, e.g., a lease record retrieved from centralized storage does not match a lease record which was previously stored in local storage of the device, as indicated by block 254, the device transitions to tampering detected state 212, as indicated by arrow 256.

Various scenarios will now be described regarding state transitions from the pending active state 208. While in the pending active state 210, after half of the duration of the lease time interval has elapsed, e.g., after 2.5 minutes, the device attempts to read a set of lease records from the central storage device. If the lease which was previously written was not found, e.g., the previously written lease was not in the retrieved set of records from the centralized storage device or the centralized storage device is not responding to requests for lease records, then the device generates and writes a new lease to both local and centralized storage, as indicated by block 238, and the device remains in the pending active state 208, as indicated by arrow 240. In the pending active state 208 the device continues to use leased resources, provided the device has not been in the pending active state for more than 12 hours. After 12 hours have passed with the device remaining in the pending active state 208, as indicated by block 250, the device transitions into the tampering detected state 212, as indicated by arrow 252.

Alternatively, if the previously written lease was found in the retrieved lease records from the centralized storage device and the device determines that resources are not exceeded, e.g., based on retrieved lease records of other devices, the number of resources intended to be used by the device in the new lease, and the total number of resources available to be leased, e.g., by an entity in accordance with a contract, the device writes a new lease record to local and centralized storage as indicated by block 242, and the device transitions into the active state as indicated by arrow 244.

Alternatively, if the previously written lease was found in the retrieved lease records from the centralized storage device and the device determines that resources are exceeded, e.g., based on retrieved lease records of other devices, the number of resources intended to be used by the device in the new lease, and the total number of resources available to be leased, e.g., by an entity in accordance with a contract, the device writes a new lease to local and centralized storage, as indicated by block 246, and the device transitions into the pending inactive state 210 as indicated by arrow 248. In the pending inactive state 210 the device uses the leased resources.

Alternatively, if the device notices a modified lease record in the retrieved lease records from centralized storage, e.g., a lease record retrieved from centralized storage does not match a lease record which was previously stored in local storage of the device, as indicated by block 234, the device transitions to tampering detected state 212, as indicated by arrow 236.

Various scenarios will now be described regarding state transitions from the inactive state 206. While in the inactive state 206, the device attempts to read a set of lease records from the central storage device. If the device determines that resources are not exceeded, e.g., based on retrieved lease records of other devices, the number of resources intended to be used by the device in the new lease, and the total number of resources available to be leased, e.g., by an entity in accordance with a contract, the device writes a new lease record to local and centralized storage as indicated by block 278, and the device transitions into the active state as indicated by arrow 280.

Alternatively, if the device determines that resources are exceeded and resource for the device are unavailable, e.g., based on retrieved lease records of other devices, the number of resources intended to be used by the device in the new lease, and the total number of resources available to be leased, e.g., by an entity in accordance with a contract, as indicted by block 274, the device remains in the inactive state of operation as indicated by arrow 276.

Alternatively, if the device notices a modified lease record in the retrieved lease records from centralized storage, e.g., a lease record retrieved from centralized storage does not match a lease record which was previously stored in local storage of the device, as indicated by block 270, the device transitions to tampering detected state 212, as indicated by arrow 272.

FIG. 3, comprising the combination of FIG. 3A, FIG. 3B, FIG. 3C, FIG. 3D, FIG. 3E, FIG. 3F, FIG. 3G, FIG. 3H and FIG. 3J, is a flowchart 300 of an exemplary method of operating a first device, e.g., a server, in accordance with various exemplary embodiments. The first device implementing the method of flowchart 300 is, e.g., one of devices (102, . . . , 104) of system 100 of FIG. 1 and/or a device configured to implement the state diagram 200 of FIG. 2.

Operation of the exemplary method starts in step 302, in which the first device, e.g., device 102, is powered on and initialized. Operation proceeds from start step 302 to step 304. In step 304 the first device determines a number of resources, e.g., a number of cores, to be used by the first device. Steps 306, 308, 308, 310, 312 and 314 are optional steps, which are included in some embodiments, and omitted in other embodiments. In some embodiments, operation proceeds from step 304 to step 320. In other embodiments, operation proceeds from step 304 to step 306.

In step 306 the first device retrieves unexpired lease records from a central storage device, e.g., central storage device 108. Operation proceeds from step 306 to step 308. In step 308 the first device stores the retrieved unexpired lease records in local storage, e.g., in local storage 106. Operation proceeds from step 308 to step 310.

In step 310 the first device determines the number of resources in use based on the retrieved unexpired lease information. Operation proceeds from step 310 to step 312.

In step 312 the first device determines the number of resources available for lease, e.g., the maximum number of resources, e.g., in accordance with a contract between an entity and a resource server provider, minus the number of resources in use based on the retrieved unexpired lease information. Operation proceeds from step 312 to step 314.

In step 314 the first device determines whether or not the number of resources to be used by the first device is less than or equal to the number of resources available for lease. If first device determines that the number of resources to be used by the first device is not less than or equal to the number of resources available for lease, then operation proceeds from step 314 to step 316, in which the first device waits for a predetermined amount of time, e.g., a time period which is half the period of the lease time interval, and then operation proceeds from step 316, via connecting node A 318 to step 304. However, if in step 314, the first device determines if the number of resources to be used by the first device is less than or equal to the number of resources available for lease, then operation proceeds from step 314 to step 320.

In step 320 the first device generates a lease record including: information identifying the first device, information indicating the number of resources, e.g., cores, to be used by the first device, and information indicating a time period in which the lease is to be valid, e.g., a lease start time and a lease end time. Operation proceeds from step 320 to step 322. In step 322 the first device writes the generated lease record to local storage. Operation proceeds from step 322 to step 324. In step 324 the first device writes the generated lease record to the central storage device. Operation proceeds from step 324 to step 326 in which the first device enters an active state of operation. Operation proceeds from step 326 to step 328 and via connecting node B 330 to step 332.

In step 328 the first device uses one or more leased resources, e.g., cores, while operating in the active state.

In step 332 the first device sets the lease renewal time value, e.g., to a predetermined duration. In some embodiments, the lease renewal time value is set to be ½ the lease interval time. For example, in one such embodiment lease time intervals are 5 minutes, and leases are attempted to be renewed after 2.5 minutes has expired from the start of the lease. Operation proceeds from step 332 to step 334.

In step 334 the first device determines if the lease renewal time has been reached. If the lease renewal time has not been reached operation proceeds from the output of step 334 to the input of step 334. However, if the lease renewal time has been reached, operation proceeds from step 334 to step 336.

In step 336 the first device attempts to retrieve non-expired lease records from the common central storage device. Step 336 may, and generally does, include step 338, in which the first device retrieves a set of non-expired lease records from the central storage device. Operation proceeds from step 336 to step 340, in which the first device stores any retrieved non-expired lease records, e.g., corresponding to other devices, in local storage. Operation proceeds from step 340 to step 342. In step 342 the first device compares one or more lease records in the retrieved set of non-expired lease records to locally stored lease record information to determine if any of the retrieved lease records for which a local copy exists were altered. Operation proceeds from step 342 to step 344.

In step 344, if the comparing of step 342 determined that one or more lease records for which a local copy exists were altered, operation proceeds from step 344 to step 346 in which the first device transitions into a tampering detected state of operation. Operation proceeds from step 346, via connecting node J 348, to step 546.

Returning to step 344, if the comparing of step 342 did not determine that one or more lease records for which a local copy exists were altered, operation proceeds from step 344 to step 350 in which the first device checks the retrieved set of non-expired lease records to determine if the previously written lease is missing from the retrieved set of non-expired lease records. Operation proceeds from step 350 to step 352.

In step 352 if the previously written lease was not found, then operation proceeds from step 352 to step 354, in which the first device generates a new lease record. Operation proceeds from step 354 to step 356, in which the first device writes the new lease record to local storage. Operation proceeds from step 356 to step 358 in which the first device writes the new lease record to the central storage device. Operation proceeds from step 358 to step 360, in which the first device transitions to a pending active state of operation. Operation proceeds from step 360 to step 362, in which the first device starts a pending active state timer. Operation proceeds from step 362 to step 364, in which the first device continues to use the leased resources while operating in the pending active state of operation, and, via connecting node C 366 to step 398.

Returning to step 352, if the previously written lease was found, then operation proceeds from step 352, via connecting node D 368, to step 369 or step 370. Step 369 is an optical step included in some embodiments, and omitted in some other embodiments. In some embodiments, the determined number of resources to be used by the first device is determined in step 304 and remains unchanged, and thus step 369 is omitted. In some other embodiments, the number of resources to be used by the first device may, and sometimes does change over time, and thus step 369 is included. In step 369 the first device determined a number of resources, e.g., cores to be used by the first device. Operation proceeds from step 369 to step 370.

In step 370 the first device determines, based on the retrieved lease information and the number of resources to be used if there are sufficient resources available to support a new lease. For example, the first device compares the total number of resources currently leased by devices, other than the first device, corresponding to an entity, e.g., a lessee such as a person or company, plus the number of resources to be used by the first device, to a total number of resources, e.g., processing cores, the entity is authorized to use, to determine if there are sufficient resources available for the new lease. Operation proceeds from step 370 to step 372.

In step 372, if the determination of step 370 is that there are sufficient resources available to support a new lease, then operation proceeds from step 372 to step 374 in which the first device generates a new lease record. Operation proceeds from step 374 to step 376 in which the first device writes the new lease record to local storage. Operation proceeds from step 376 to step 378 in which the first device writes the new lease to the central storage device. Operation proceeds from step 378 to step 380 in which the first device is controlled to remain in the active state of operation. Operation proceeds from step 380 to step 382 and via connecting node E 384 to the input of step 334. In step 382 the first device continues to use the leased resources while operating in the active state of operation.

Returning to step 372, in step 372, if the determination of step 370 is that there are not sufficient resources available to support a new lease, then operation proceeds from step 372 to step 386 in which the first device generates a new lease record. Operation proceeds from step 386 to step 388 in which the first device writes the new lease record to local storage. Operation proceeds from step 388 to step 390 in which the first device writes the new lease to the central storage device. Operation proceeds from step 390 to step 392 in which the first device enters a pending inactive state of operation. Operation proceeds from step 392 to step 394 and via connecting node F 396 to the input of step 462. In step 394 the first device continues to use the leased resources while operating in the pending inactive state of operation.

Returning to step 398, in step 398 the first device checks to determine if the pending active time has reached a predetermined limit, e.g., 12 hours. If the determination of step 398 is that the pending active timer has reached the predetermined limit, then operation proceeds from step 398 to step 400 in which the first device transitions to a tampering detected state of operation. Operation proceeds from step 400, via connecting node J 348, to step 546.

However, if the determination of step 398 is that the pending active timer has not reached the predetermined limit, then operation proceeds from step 398 to step 402 in which the first device checks as to whether or not the lease renewal time has been reached. If the determination of step 402 is that the lease renewal time has not been reached operation proceeds from the output of step 402 to the input of step 402. However, if the determination of step 402 is that that lease renewal time has been reached, then operation proceeds from step 402 to step 404.

In step 404 the first device attempts to retrieve non-expired lease records from the common central storage device. Step 404 may, and generally does, include step 406 in which the first device retrieves a set of non-expired lease records from the central store device. Operation proceeds from step 404 to step 408. In step 408 the first device stores any retrieved non-expired new lease records, e.g., corresponding to other device in local storage. Operation proceeds from step 408 to step 410.

In step 410 the first device compares one or more lease records in the retrieved set of non-expired lease records to locally stored lease record information to determined if any of the retrieved lease records for which a local copy exists were altered. Operation proceeds from step 410 to step 412.

In step 412 if the comparison of step 410 determined that one or more lease records for which a local copy exists were altered, then operation proceeds from step 412 to step 414. In step 414 the first device transitions into a tampering detected state of operation. Operation proceeds from step 414, via connecting node J 348, to step 546.

in step 412, if the comparison of step 410 did not determine that one or more lease records for which a local copy exists were altered, then operation proceeds from step 412 to step 416. In step 416 the first device checks the retrieved set of non-expired lease records to determine if the previously written lease is missing from the retrieved set of non-expired lease records. Operation proceeds from step 416 to step 418.

In step 418, if the previously written lease was not found in the check of step 416, then operation proceeds from step 418 to step 420 in which the first device generates a new lease record. Operation proceeds from step 420 to step 422. In step 422 the first device writes the new lease record to the local storage. Operation proceeds from step 422 to step 424, in which the first device writes the new lease record to the central storage device. Operation proceeds from step 424 to step 426 in which the first device is controlled to remain in the pending active state of operation. Operation proceeds from step 426 to step 428, in which the first device continues to use the leased resources while operating in the pending active state of operation, and to the input of step 398.

Returning to step 418, in step 418 if the check of step 416 determined that the retrieved set of non-expired lease records includes the previously written lease, then operation proceeds from step 418, via connecting node G 430 to step 431 or step 432 depending on the particular embodiment. In some embodiments, the number of resources used by the first device can, and sometimes does change over time, and step 431 is included. In some other embodiments, the number of resources used by the first device remains fixed at the value determined in step 304 and step 431 is omitted.

In step 431 the first device determines the number of resources, e.g. cores, to be used by the first device. Operation proceeds from step 431 to step 432. In step 432 the first device determines, based on the retrieved lease information and the number of resources to be used if there are sufficient resources available to support a new lease. For example, the first device compares the total number of resources currently leased by devices, other than the first device, corresponding to an entity, e.g., a leasee such as a person or company, plus the number of resources to be used by the first device, to a total number of resources, e.g., processing cores, the entity is authorized to use, to determine if there are sufficient resources available for the new lease. Operation proceeds from step 432 to step 434.

In step 434, if the determination of step 432 is that there are sufficient resources available to support the new lease, then operation proceeds from step 434 to step 436, in which the first device generates a new lease record. Operation proceeds from step 436 to step 438 in which the first device writes the new lease record to local storage. Operation proceeds from step 438 to step 440, in which the first device writes the new lease record to the central storage device. Operation proceeds from step 440 to step 442, in which the first device switches to the active state of operation. Operation proceeds from step 442 to step 444, in which the first device continues to use the leased resources while operating in the active state of operation, and via connecting node E 384 to step 334.

Returning to step 434, if the determination of step 432 is that there are not sufficient resources available to support the new lease, then operation proceeds from step 434 to step 448, in which the first device generates a new lease record. Operation proceeds from step 448 to step 450 in which the first device writes the new lease record to local storage. Operation proceeds from step 450 to step 452, in which the first device writes the new lease record to the central storage device. Operation proceeds from step 452 to step 454, in which the first device switches to a pending inactive state of operation. Operation proceeds from step 454 to step 456, in which the first device continues to use the leased resources while operating in the pending inactive state of operation, and via connecting node F 396 to step 462.

In step 462 the first device checks as to whether or not the lease renewal time has been reached. If the determination of step 462 is that the lease renewal time has not been reached operation proceeds from the output of step 462 to the input of step 462. However, if the determination of step 462 is that that lease renewal time has been reached, then operation proceeds from step 462 to step 464.

In step 464 the first device attempts to retrieve non-expired lease records from the common central storage device. Step 464 may, and generally does, include step 466 in which the first device retrieves a set of non-expired lease records from the central store device. Operation proceeds from step 464 to step 468. In step 468 the first device stores any retrieved non-expired new lease records, e.g., corresponding to other device in local storage. Operation proceeds from step 468 to step 470.

In step 470 the first device compares one or more lease records in the retrieved set of non-expired lease records to locally stored lease record information to determine if any of the retrieved lease records for which a local copy exists were altered. Operation proceeds from step 470 to step 472.

In step 472 if the comparison of step 470 determined that one or more lease records for which a local copy exists were altered, then operation proceeds from step 472 to step 474. In step 474 the first device transitions into a tampering detected state of operation. Operation proceeds from step 474, via connecting node J 348, to step 546.

In step 472, if the comparison of step 470 did not determine that one or more lease records for which a local copy exists were altered, then operation proceeds from step 472 to step 476. In step 476 the first device checks the retrieved set of non-expired lease records to determine if the previously written lease is missing from the retrieved set of non-expired lease records. Operation proceeds from step 476 to step 478.

In step 478, if the previously written lease was not found in the check of step 476, then operation proceeds from step 478 to step 480 in which the first device generates a new lease record. Operation proceeds from step 480 to step 482. In step 482 the first device writes the new lease record to the local storage. Operation proceeds from step 482 to step 484, in which the first device writes the new lease record to the central storage device. Operation proceeds from step 484 to step 486 in which the first device transitions to the pending active state of operation. Operation proceeds from step 486 to step 487 in which the first device starts a pending active timer. Operation proceeds from step 487 to step 488, in which the first device continues to use the leased resources while operating in the pending active state of operation, and via connecting node C 366 to step 398.

Returning to step 478, in step 478 if the check of step 476 determined that the retrieved set of non-expired lease records includes the previously written lease, then operation proceeds from step 478, via connecting node H 490 to step 491 or step 492 depending on the particular embodiment. In some embodiments, the number of resources used by the first device can, and sometimes does change over time, and step 491 is included. In some other embodiments, the number of resources used by the first device remains fixed at the value determined in step 304 and step 491 is omitted.

In step 491 the first device determines the number of resources, e.g. cores, to be used by the first device. Operation proceeds from step 491 to step 492. In step 492 the first device determines, based on the retrieved lease information and the number of resources to be used if there are sufficient resources available to support a new lease. For example, the first device compares the total number of resources currently leased by devices, other than the first device, corresponding to an entity, e.g., a leasee such as a person or company, plus the number of resources to be used by the first device, to a total number of resources, e.g., processing cores, the entity is authorized to use, to determine if there are sufficient resources available for the new lease. Operation proceeds from step 492 to step 494.

In step 494, if the determination of step 492 is that there are sufficient resources available to support the new lease, then operation proceeds from step 494 to step 496, in which the first device generates a new lease record. Operation proceeds from step 496 to step 498 in which the first device writes the new lease record to local storage. Operation proceeds from step 498 to step 500, in which the first device writes the new lease record to the central storage device. Operation proceeds from step 500 to step 502, in which the first device transitions to the active state of operation. Operation proceeds from step 502 to step 504, in which the first device continues to use the leased resources while operating in the active state of operation, and via connecting node E 384 to step 334.

Returning to step 494, if the determination of step 492 is that there are not sufficient resources available to support the new lease, then operation proceeds from step 494 to step 506, in which the first device deletes the currently stored lease record for the first device in local memory. Operation proceeds from step 506 to step 508, in which the first device enters an inactive state of operation. Operation proceeds from step 508 to step 510 in which the first device refrains from using resources which were sought to be leased while in the inactive state of operation, and via, connecting node I 512 to step 514.

In step 514 the first device attempts to retrieve non-expired lease records from the common central storage device. Step 514 may, and generally does, include step 516 in which the first device retrieves a set of non-expired lease records from the central storage device. Operation proceeds from step 514 to step 520. In step 520 the first device stores any retrieved non-expired new lease records, e.g., corresponding to other device in local storage. Operation proceeds from step 520 to step 522.

In step 522 the first device compares one or more lease records in the retrieved set of non-expired lease records to locally stored lease record information to determine if any of the retrieved lease records for which a local copy exists were altered. Operation proceeds from step 522 to step 524.

In step 524 if the comparison of step 522 determined that one or more lease records for which a local copy exists were altered, then operation proceeds from step 524 to step 526. In step 526 the first device transitions into a tampering detected state of operation. Operation proceeds from step 526, via connecting node J 348, to step 546.

In step 524, if the comparison of step 522 did not determine that one or more lease records for which a local copy exists were altered, then operation proceeds from step 524 to step 527 or step 528, depending upon the particular embodiment. In some embodiments, the determined number of resources used by the first device can, and sometimes does change and step 527 is included. In some other embodiments, the determined number of resources used by the first device remains fixed at the number determined in step 404 and step 527 is omitted.

In step 527 the first device determines a number of resources, e.g., cores, to be used by the first device. Operation proceeds from step 527 to step 528. In step 528 the first device determines, based on the retrieved lease information and the number of resources to be used if there are sufficient resources available to support a new lease. For example, the first device compares the total number of resources currently leased by devices, other than the first device, corresponding to an entity, e.g., a leasee such as a person or company, plus the number of resources to be used by the first device, to a total number of resources, e.g., processing cores, the entity is authorized to use, to determine if there are sufficient resources available for the new lease. Operation proceeds from step 528 to step 530.

In step 530 if the determination of step 528 is that there are sufficient resources available to support the new lease, then operation proceeds from step 530 to step 532, in which the first device generate a new lease record. Operation proceeds from step 532 to step 534 in which the first device writes the new lease record to local storage. Operation proceeds from step 534 to step 536 in which the first device transitions to the active state of operation. Operation proceeds from step 538 to step 540 in which the first device uses the leased resources while operating in the active state of operation, and via connecting node E 384 to step 334.

Returning to step 530, if the determination of step 528 is that there are not sufficient resources available to support the new lease, then operation proceeds from step 530 to step 542 and step 544. In step 542 the first device refrains from using resources which were sought to be leased while in the inactive state of operation. In step 544 the first device remains in the inactive state without writing a new lease to the central storage device. Operation proceeds from step 544 to step 514.

Returning to step 546, in step 546 the first device generates an alert, e.g., an email reporting the detected altered lease record or an email reporting the inability to retrieve a written lease record corresponding to the first device from the central storage device, reporting the tampering. Operation proceeds from step 546 to step 548 in which the first device sends the generated alert to the resource provider, e.g., resource provider device 150. Operation proceeds from step 548 to step 550 in which the first device is controlled to refrain from proceeding with a new lease while in the tampering detected state of operation.

In various embodiments, the first device uses leased resources, e.g., in accordance with a generated lease record, while in any of: the active state of operation, the pending active state of operation, and pending inactive state of operation; and the first device does not use resources which it desires to lease while in the inactive state of operation.

FIG. 3A includes an exemplary flow for transitions from OFF to the active state of operation. FIG. 3B in combination with FIG. 3C includes exemplary flows for transitions from the active state of operation to other states of operation. FIG. 3D in combination with FIG. 3E includes exemplary flows for transitions from the pending active state of operation to other states of operation. FIG. 3F in combination with FIG. 3G includes exemplary flows for transitions from the pending inactive state of operation to other states of operation. FIG. 3H includes exemplary flows for transitions from the inactive state of operation to other states of operation. FIG. 3J includes exemplary operations performed in the tampering detected state of operation.

Figure 4:
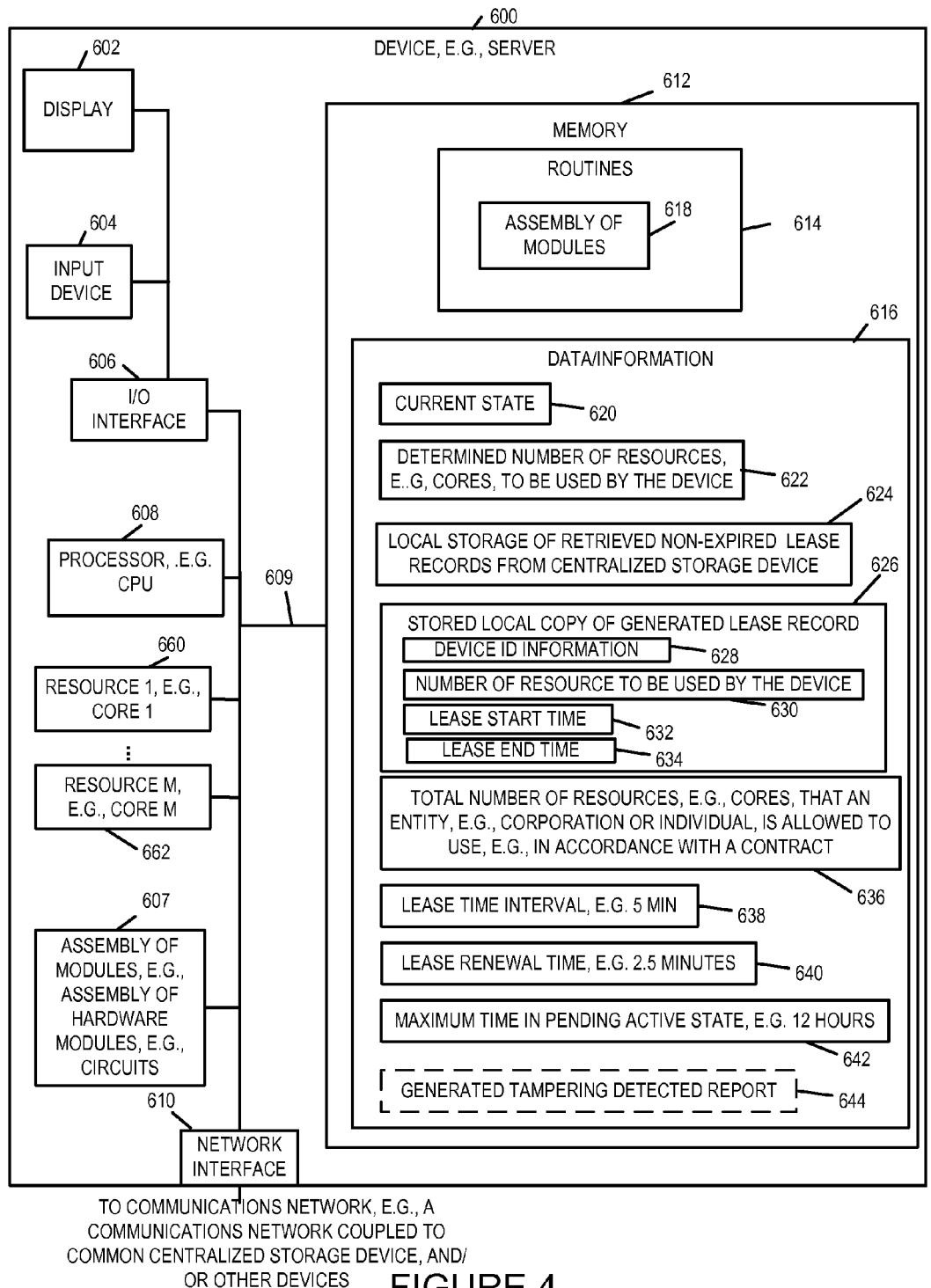
FIG. 4 is a drawing of an exemplary device, e.g., a server, in accordance with an exemplary embodiment.

FIG. 4 is a drawing of an exemplary device 600, e.g., a server, implemented in accordance with an exemplary embodiment. Exemplary device 600 is, e.g., one of the devices (102, . . . , 104) of system 100 of FIG. 1, a device implementing the state diagram of FIG. 2, and/or a device implementing the flowchart 300 of FIG. 3.

Device 600 includes a display 602, an input device 604, e.g., a keyboard, mouse, etc., an I/O interface 606, a processor 608, e.g., a CPU, an assembly of module 607, e.g., an assembly of hardware modules, e.g., circuits, a network interface 610, and a memory 612. The I/O interface 606 couples the display 602 and input device 604 to bus 609. The device 600 further includes a plurality of resources, e.g., processing cores (resource 1 660, e.g., core 1, . . . , resource M 662, e.g., core M). The I/O device 606, processor 608, assembly of modules 607, network interface 610, memory 612 and resources, e.g., cores (660, . . . , 662) are coupled together via bus 609 over which the various elements may interchange data and information. The network interface 610 couples the device 600 of a communications network, e.g., network 106, which is coupled to a common centralized storage device, e.g., centralized storage device 108. The common centralized storage device is used by a plurality of servers to store lease records corresponding to resources.

Memory 612 includes routines 614 and data/information 616. Routines 614 includes an assembly of modules 618. Data/information 616 includes information 620 indicating the current state of device 600, e.g., one of Active, Pending Active, Pending Inactive, Inactive, and Tampering Detected, a determined number of resources, e.g. cores to be used 622 by device 600, local storage of retrieved non-expired lease records which were retrieved from the centralized storage device 624, e.g. a set of retrieved non-expired lease records. Data/information 616 further includes a stored local copy of a generated lease record 626. The generated lease record 626 which was generated and stored by device 600 includes device ID information 628 identifying device 600, a number of resources, e.g., cores, to be used by the device, a lease start time 632 and a lease end time 634. Data/information 616 further includes a total number of resources that an entity, e.g., a corporation of individual, is allowed to use, e.g., in accordance with a contract with a resource provider. Data/information 636 further includes information 636 identifying the lease time interval, e.g., 5 minutes, information 640 identifying the lease renewal time, e.g., 2.5 minutes, and information 642 identifying a maximum time that the device 600 is allowed to remain in pending active state, e.g. 12 hours. Data/information 616 may and sometimes does include a generated tampering detected report 644, e.g., which was generated in response to the device being transitioned into the tampering detected state of operation and which is communicated, e.g., to a management system of a resource provider.

Figure 5:
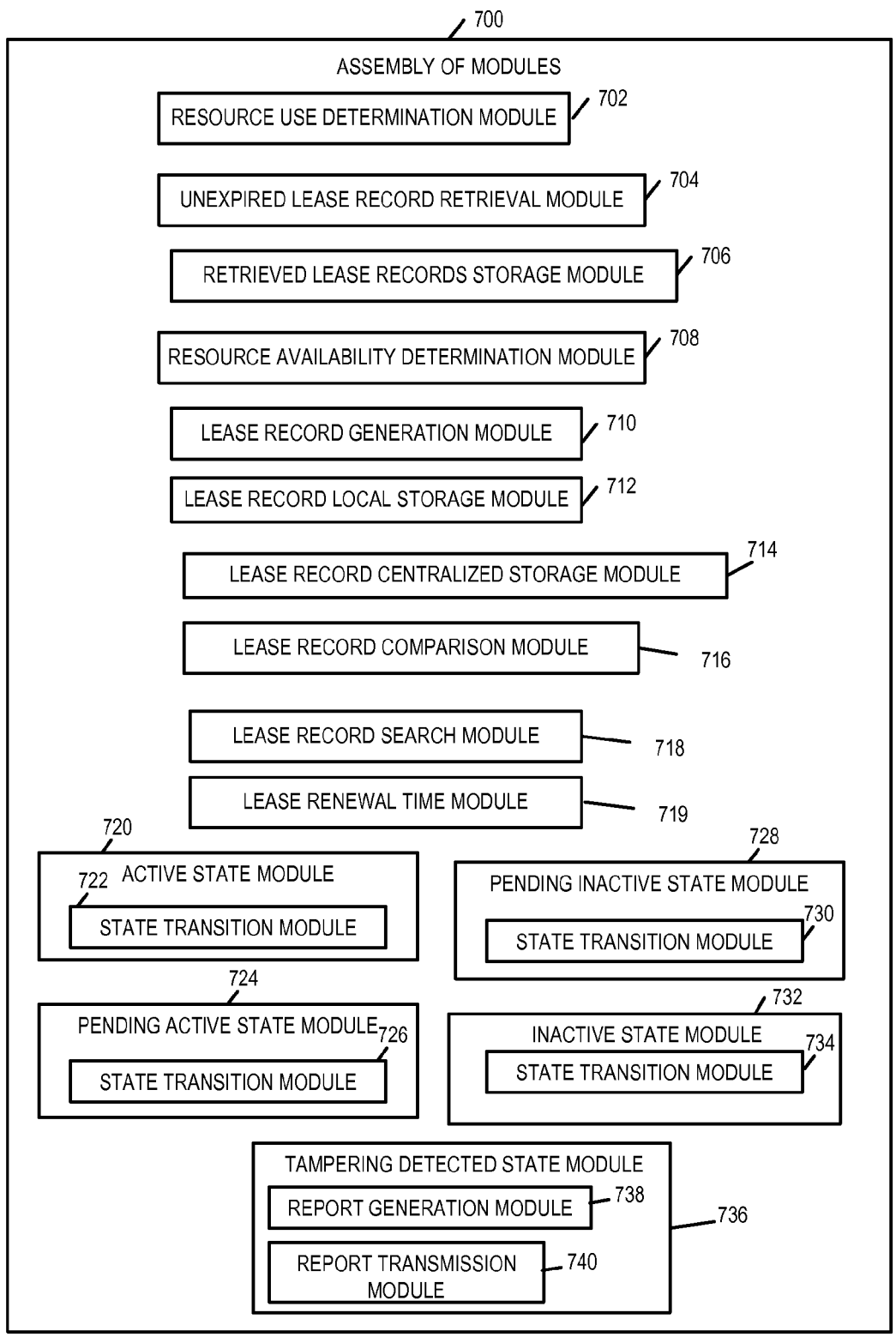
FIG. 5 is a drawing of an exemplary assembly of modules which may be included in the exemplary device of FIG. 4.

FIG. 5, illustrates an assembly of modules 700 which can, and in some embodiments is, used in the exemplary device 600, e.g., server illustrated in FIG. 4, e.g., as assembly of modules 618 and/or 607. Assembly of modules 700 can be implemented in hardware within the processor 608 of the device 600, e.g., as individual circuits. The modules in the assembly 700 can, and in some embodiments are, implemented fully in hardware within the processor 608, e.g., as individual circuits. In other embodiments some of the modules are implemented, e.g., as circuits, within the processor 608 with other modules being implemented, e.g., as circuits in assembly of modules 607, external to and coupled to the processor 608. As should be appreciated the level of integration of modules in the processor and/or with some modules being external to the processor may be one of design choice.

Alternatively, rather than being implemented as circuits, all or some of the modules 700 may be implemented in software and stored in the memory 612 of the device 600 with the modules controlling operation of the device 600 to implement the functions corresponding to the modules when the modules are executed by a processor, e.g., processor 608. In some such embodiments, the assembly of modules 700 is included in the memory 612, e.g., as assembly of modules 618. In still other embodiments, various modules are implemented as a combination of hardware and software, e.g., with another circuit external to the processor providing input to the processor 608 which then under software control operates to perform a portion of a module's function. While shown in the FIG. 4 embodiment as a single processor, e.g., computer, it should be appreciated that the processor 608 may be implemented as one or more processors, e.g., computers.

When implemented in software the modules include code, which when executed by the processor 608, configure the processor 608 to implement the function corresponding to the module. In embodiments where the assembly of modules 700 is stored in the memory 612, the memory 612 is a computer program product comprising a computer readable medium comprising code, e.g., individual code for each module, for causing at least one computer, e.g., processor 608, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 7 control and/or configure the device 600 or elements therein such as the processor 608, to perform the functions of the corresponding steps illustrated in the method of flowchart 300 of FIG. 3 and/or to implement the state diagram of FIG. 2. Thus the assembly of modules 700 includes various modules that perform functions of the corresponding steps of the method shown in FIG. 3.

Assembly of modules 700 includes a resource use determination module 702, an unexpired lease record retrieval module 704, a retrieved lease records storage module 706, a resource availability determination module 708, a lease record generation module 710, a lease record storage module 712, a lease record centralized storage module 714, a lease record comparison module 716, a lease record search module 718, a lease renewal time module 719, an active state module 720, a pending inactive state module 728, a pending active state module 724, an inactive state module 732, and a tampering detected state module 736. Active state module 720 includes a state transition module 722. Pending inactive state module 728 includes a state transition module 730. Pending active state module 724 includes a state transition module 726. Pending inactive state module 732 includes a state transition module 734. Tampering detected state module 736 includes a report generation module 738 and a report transmission module 740.

Resource use determination module 702 is configured to determine a number of resources, e.g., cores, to be used by device 600. In various embodiments, resource use determination module 702 is configured to implement steps 304, 369, 431, 491, and 527 of flowchart 300 of FIG. 3.

Unexpired lease retrieval module 704 is configured to retrieve a set of non-expired lease records from a central storage device. In various embodiments, unexpired lease retrieval module 704 is configured to implement steps 306, 336, 338, 404, 406, 464, 466, 514, and 516 of flowchart 300 of FIG. 3.

Retrieved lease records storage module 706 is configured to store retrieved non-expired lease records which were retrieved from the centralized storage device, in local storage. In various embodiments, the retrieved lease records storage module 706 is configured to implement steps 308, 340, 408, 468, and 520 of flowchart 300 of FIG. 3.

Resource availability determination module 708 is configured to determine based on the retrieved lease information and the number of resources to be used if there are sufficient resources available to support a new lease and control operation as a function of the determination. In various embodiments, the resource availability determination module 708 is configured to implement steps 310, 312, 314, 342, 370, 372, 432, 434, 492, 494, 528, and 530.

Resource availability determination module 708 uses information 622 indicating the number of resources to be used by the device, resource usage information corresponding to other device obtained from information 624 and information 638 indicating a total number of resources that an entity is allowed to use, in making a determination.

Lease record generation module 710 is configured to generate a lease record for device 600. In various embodiments, the lease record generation module 710 is configured to implement steps 320, 354, 374, 386, 420, 436, 448, 480, 496, and 532.

Lease record local storage module 712 is configured to write a generated lease record to local storage. Stored local copy of generated lease record 626 has been written to memory 616 in device 600 by module 712. In various embodiments, the lease record local storage module 712 is configured to implement steps 322, 356, 376, 388, 422, 438, 450, 482, 498, and 534 of flowchart 300 of FIG. 3.

Lease record centralized storage module 714 is configured to write the lease record to a centralized storage device, e.g., centralized storage device 108. In various embodiments, the lease record centralized storage module 714 is configured to implement steps 324, 358, 378, 390, 424, 440, 452, 484, 500, and 536 of flowchart 300 of FIG. 3.

Lease record comparison module 716 is configured to compare one or more lease records in a retrieved set of non-expired lease records to locally stored lease record information to determine if any of the retrieved lease records for which a local copy exists were altered. Lease record comparison module 716, in various embodiments, is configured to implement steps 342, 344, 410, 412, 470, 472, 522, and 524 of flowchart 300 of FIG. 3.

Lease record search module 718 is configured to check the retrieved set of non-expired lease records to determine if the previously written lease is missing from the retrieved set of non-expired lease records. Lease record search module 718 is further configured to determine if the previously written lease record was not found because the device was unable to retrieve lease records from the central storage device when it attempted to retrieve lease records. In various embodiments, lease record search module 718 is configured to implement steps 350, 352, 416, 418, 476, and 478.

Lease renewal time module 719 is configured to determine when it is time for the device to perform a lease renewal. In various embodiments, lease renewal time module 719 implements steps 384, 402, and steps 462 of flowchart 300 of FIG. 3.

Active state module 720 is configured to control operations while in the active state of operation. In various embodiments active state module 720 is configured to implement steps 328, 382, 444, and 540. State transition module 722 is configured to test conditions and control state transitions from the active state to other states. In various embodiments, state transition module 722 is configured to implement steps 346, 360, 380 and 392.

Pending active state module 724 is configured to control operations while in the pending active state of operation. In various embodiments pending active state module 724 is configured to implement steps 362, 364, 398, 428, 487, 488. State transition module 726 is configured to test conditions and control state transitions from the pending active state to other states. In various embodiments, state transition module 726 is configured to implement steps 400, 414, 442 and 454.

Pending inactive state module 728 is configured to control operations while in the pending inactive state of operation. In various embodiments pending inactive state module 728 is configured to implement steps 394, and 456. State transition module 730 is configured to test conditions and control state transitions from the pending inactive state to other states. In various embodiments, state transition module 730 is configured to implement steps 474, 486, 502, and 508.

Inactive state module 732 is configured to control operations while in the inactive state of operation. In various embodiments inactive state module 732 is configured to implement steps 394, 456, 510, and 542. State transition module 734 is configured to test conditions and control state transitions from the inactive state to other states. In various embodiments, state transition module 734 is configured to implement steps 536, 538, and 544.

Tampering detected state module 736 is configured to control operation while in the tampering detected state of operation. Report generation module is configured to generate a tampering detected report 644. Report transmission module 740 is configured to send a generated tampering report to a service provider management system 150.

In various embodiments, the state modules (720, 724, 724, 728, 730) are configured to implement the state diagram of FIG. 2 and/or various steps of FIG. 3. In various embodiments, the state modules (720, 724, 724, 728, 730) are configured to control other modules in assembly of module 700 to perform an operation.

Various aspects and/or features of some embodiments are further discussed below.

In some embodiments a "cloud licensing" solution uses a centralized storage system, e.g., a centralized storage device, as a way for multiple servers to communicate with one another about how many CPU cores are in use. The basic idea is that, every X minutes, e.g., every 2.5 minutes, each server writes a small amount of data into the centralized storage system indicating how many CPU cores it intends to use for the next Y minutes, e.g., the next 5 minutes. In some such embodiments, this bit of data is called a lease record. The lease record specifies: (i) the server; (ii) how many cores the server is using; (iii) when the lease was created; and (iv) when the lease expires (Y minutes after creation, e.g. 5 minutes after creation). A lease record, once written, should never change. To update their current lease information, servers do not edit existing lease records; they simply write new lease records to replace the old. A lease record is only authoritative for, at most, Y minutes, e.g. 5 minutes. Once expired, it tells us nothing about how many cores the server is using.

As a server is running, it is repeatedly writing new lease records into storage (once every X minutes, e.g., once every 2.5 minutes). If a server stops running, then lease records for that server will stop appearing in storage. The lack of new lease records should indicate to us that the machine is no longer using any CPU cores. So, to know how many CPU cores are currently in use across all machines, one simply sums the number of cores in the latest, non-expired lease records for all servers.

There are two particularly interesting technical problems that are taken into account by the exemplary method, which make the exemplary method work well in a cloud environment. The first problem which is taken into account by the exemplary method is the potential of outside tampering of the lease records. The second problem which is taken into account by the exemplary method is eventual consistency delays in the centralized storage system.

Various aspects and/or features related to accounting for tampering of lease records will now be described. There is nothing preventing a thief from tampering with the lease records in an attempt to artificially reduce the number of cores in use (allowing them to run more servers than they paid for). Each of our servers reads all of the latest, authoritative, non-expired lease records from centralized storage system, e.g., a centralized storage device, to determine how many cores are currently being used in total. If the thief has artificially adjusted the values in those lease records, or outright deleted them, we would get the wrong sum. Various embodiments of the present invention implement a method of defeating the edit case of this attack. Before a server writes a lease record, it saves a copy of what it writes within its own memory, e.g., a local copy of the lease record. Before writing its next lease record, it verifies that the current lease record stored in the centralized storage system is what it previously stored in its own memory. If there is any difference in the data, the server can safely assume tampering has occurred and can respond immediately, e.g., perhaps the server is shut down. In addition to detecting when its own lease record has been tampered with, it is also easy for each server to detect when the lease records of other servers have been tampered with. This is accomplished this by having each server storing a copy of the full set of lease records within its own memory. Each time a server reads all of the lease records from the centralized storage system, the server is able to verify that any lease records it has already seen in the past have not changed. In short, the servers, implemented in accordance with the present invention, can easily detect when a lease record has been edited by an outsider and they can respond immediately with a policy response, e.g., shut down the server or implement another response in accordance with a management system.

However, if a server's lease record is missing, one cannot assume it was deleted by an attacker. That case may be due to delays in the centralized storage system itself. Various aspects and/or features related to accounting for eventual consistency delay in a centralized storage system will now be described. The technical problem here is that the centralized storage system is only an eventually consistent system. What that means is that any data that a server writes is not guaranteed to be immediately visible by every server when they go to read data in centralized storage system. For example, server A might write a lease record at 9:06 am, but when server B goes to read all of the latest lease records at 9:07 am, server A's record does not appear to be present at all. Given more time, if server B keeps reading from S3, eventually server A's record will appear. This sort of behavior is called eventual consistency, and it is a common behavior in large, cloud-based storage solutions. Interestingly, this delayed behavior is not limited to a situation involving multiple machines. It can show up even when there is only a single server. For example, a server may write a record to storage. Then, when the same server goes to read the record it just wrote, it finds it is not present. Given more time, the record will eventually become readable. In various embodiments, the actual delays observed in the centralized storage system are typically small. In some such embodiments, if there is a delay at all, it is usually not longer than a few seconds. But there are unusual circumstances which can introduce delays of hours, so it is not a problem that can simply be ignored.

For our licensing purposes, there are two problems that eventual consistency introduces. The first problem is that if a server cannot find its most-current lease, one of two things has happened, but we don't know which one. An attacker may have deleted the record, or there is an eventual consistency delay and the record simply is not available yet.

If a server determines that it should not run because the CPU core limit would be exceeded based on its determination, the server cannot immediately be sure that the core limit will be exceeded because of one of the following. It is possible that other servers have actually shut down and deleted their currently-active lease records, but there are eventual consistency delays in centralized storage system which are preventing the lease record data from disappearing. Thus, the apparent number of cores in use is higher than reality, and it would be incorrect for one to prevent this machine from running. It is also possible that other servers have simply crashed without gracefully deleting their currently-active lease records. In both of the above cases, the method in accordance with the present invention prefers to err on the side of being gracious and allows the server to continue running rather than being overly strict, preventing people from using the product when they should be allowed to.

An exemplary design, in accordance with some embodiments of the present invention, includes two main states a server can be in: (i) Active (the product is running) and (ii) Inactive (the product is disabled due to licensing restrictions). In order to account for the eventual consistency delays in the centralized storage system and not disable the product too quickly, the exemplary design, in accordance with various embodiments of the present invention, further includes two additional states: (iii) Pending Active and (iv) Pending Inactive. Both of these special states (Pending Active and Pending Inactive) allow the product to continue running as if in the Active state, but afford a way to eventually enforce a licensing restriction once there has been verification that there is a real problem.

Drawing 200 of FIG. 2 illustrates a state diagram which describes the various states an individual product server goes through. The Pending Active state 208 is used whenever a server can't find a lease record which it previously wrote. Perhaps it's a centralized storage system delay, or perhaps we're being attacked and the record was deleted. (One cannot know for sure). In accordance with a feature of various embodiments of the present invention, the product is allowed to continue running in this special state for up to 12 hours. During this time, the server continues to write new lease records to the centralized storage system, but as long as it is unable to read them back the server remains in the Pending Active state 208. If the server is able to read a lease record back from the centralized storage system, then it is assumed that the problem was eventual consistency and the server is simply returned to the Active state 204. But if, after 12 hours, the server could not read a lease record back from the centralized storage system, this is considered a critical failure and the server enters the Tampering Detected state 212. Technically a centralized storage system eventual consistency problem may still be the root cause, but a 12 hour delay would be extremely unusual and is a sign of a critical centralized storage system failure that prevents one from properly enforcing licensing. So whether it is due to tampering or whether it is due to a 12+ hour centralized storage system delay, it is considered this a critical failure, and the server is transitioned into Tampering Detected state 212. In this example, a 12 hour limit is used for a maximum time to remain the pending active state; however, in other embodiments, a different limit may be used.

The Pending Inactive state 210 is used whenever a server first detects that it has (potentially) exceeded the CPU core limit. The server can't know for sure due to delays in the centralized storage system, so the server waits for new lease records which it hasn't seen before to appear before acting. If, after new lease records appear, the core limit is still exceeded, the server can confidently enter the Inactive state 206. Otherwise, the server can return to the Active state 204.

Various methods and apparatus in accordance with the present invention use additional verification states, e.g., a Pending Active state and a Pending Inactive State, to delay licensing enforcement to account for centralized storage system eventual consistency delays.

The techniques of various embodiments may be implemented using software, hardware and/or a combination of software and hardware. Various embodiments are directed to apparatus, e.g., a server or a system including a plurality of servers and a common storage device. Various embodiments are also directed to methods, e.g., a method of operating a device, e.g, a server, to control resource utilization. Various embodiments are also directed to machine, e.g., computer, readable medium, e.g., ROM, RAM, CDs, hard discs, etc., which include machine readable instructions for controlling a machine to implement one or more steps of a method.

In various embodiments apparatus described herein are implemented using one or more modules to perform the steps corresponding to one or more methods. Thus, in some embodiments various features are implemented using modules. Such modules may be implemented using software, hardware or a combination of software and hardware. In some embodiments in which the modules are implemented in hardware, the modules are implemented as circuits, e.g., of a processor. In many or all of the above described embodiments, methods and/or method steps can, and in some embodiments are, implemented using computer executable instructions, such as software, included in a computer readable medium, e.g., a non-transitory computer readable medium, such as a memory device, e.g., RAM, floppy disk, etc. which when executed control a machine, e.g., general purpose computer or processor, with or without additional hardware, to implement all or portions of the above described methods. Accordingly, among other things, various embodiments are directed to a computer readable medium including computer executable instructions for causing a machine, e.g., processor or computer system, to perform one or more of the steps of the above-described method(s).

Some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a device, e.g., a server, or system. In some embodiments modules are implemented using software, in other embodiments modules are implemented in hardware, in still other embodiments the modules are implemented using a combination of hardware and/or software.

Numerous additional variations on the methods and apparatus of the various embodiments described above will be apparent to those skilled in the art in view of the above description. Such variations are to be considered within the scope of the invention.

What is claimed is:

1. A method of operating a first device to control resource utilization by the first device, the method comprising:
    determining a number of resources to be used by the first device;
    writing a first lease record to local storage;
    writing the first lease record to a central storage device;
    operating in an active state of operation in which one or more leased resources are used; and
    while operating in the active state of operation:
        retrieving a first set of non-expired lease records from the central storage device;
        comparing one or more lease records in the retrieved first set of non-expired lease records to locally stored lease record information to determine if any of the retrieved lease records for which a local copy exists were altered;
        checking the retrieved first set of non-expired lease records to determine if the first lease record is missing from the retrieved first set of non-expired lease records; and
        if it is determined that the first lease record is missing from the retrieved first set of non-expired lease records: i) writing a new lease record to local storage, ii) writing the new lease record to the central storage device, and iii) transitioning to a pending active state of operation.

2. The method of claim 1, wherein said first lease record identifies the first device, indicates the number of resources to be used by the first device, and indicates a time period in which a first lease is to be valid.

3. The method of claim 2, further comprising, while operating in said active state of operation:
    determining if, based on the retrieved first set of non-expired lease records and the number of resources to be used, there are sufficient resources available to support a first new lease;
    when it is determined that there are resources available to support the first new lease: i) writing the first new lease to the local storage, ii) writing the first new lease to the central storage device, and iii) remaining in the active state of operation; and
    when it is determined that there will not be sufficient resources available to support the first new lease: i) writing the first new lease to the local storage, ii) writing the first new lease to the central storage device, and iii) entering a pending inactive state of operation.

4. The method of claim 3, further comprising, while operating in said pending inactive state of operation:
    retrieving a second set of non-expired lease records from the centralized storage device;
    checking to determine if, based on the retrieved second set of non-expired lease records and the number of resources to be used, there are sufficient resources available to support a second new lease;
    when it is determined that there are sufficient resources available to support the second new lease: i) writing the second new lease to the local storage, ii) writing the second new lease to the central storage device, and iii) transitioning to the active state of operation; and
    when it is determined that there are not sufficient resources available to support the second new lease: i) deleting a currently stored lease for the first device in local memory, and ii) entering an inactive state of operation in which resources which were sought to be leased are not used.

5. The method of claim 3, further comprising, while operating in said pending inactive state of operation:
    retrieving a second set of non-expired lease records from the centralized storage device;
    checking the retrieved second set of non-expired lease records to determine if a lease which was recently written by the first device to the central storage device is included in the second set of retrieved lease information; and
    if it is determined that the recently written lease is missing from the retrieved second set of non-expired lease records: i) writing a second new lease to the local storage, ii) writing the second new lease to the central storage device, and iii) transitioning to the pending active state of operation.

6. The method of claim 4, further comprising, while operating in said pending inactive state of operation:
    retrieving a third set of non-expired lease records from the centralized storage device;
    determining if, based on the retrieved third set of non-expired lease records and the number of resources to be used, sufficient resources available to support a third new lease;
    when it is determined that there are sufficient resources available to support the third new lease: i) writing the third new lease to local storage, ii) writing the third new lease to the central storage device, and iii) transitioning to the active state of operation; and when it is determined that there are insufficient resources available to support the third new lease, remaining in the inactive state of operation without writing a new lease to the central storage device.

7. The method of claim 1, further comprising:
when said comparing determines that one or more lease records for which a local copy exists were altered, transitioning into a tampering detected state of operation.

8. The method of claim 1, further comprising, while operating in the pending active state of operation:
continuing to use leased resources;
retrieving another set of non-expired lease records from the central storage device;
checking if the another set of non-expired lease records retrieved from the central storage device includes a copy of the new lease record written to the central storage device; and
if the another set of non-expired lease records retrieved from the central storage device includes a copy of the new lease record written to the central storage device: i) switching to the active state of operation if sufficient resources are available to support a new lease and ii) switching to a pending inactive state of operation if sufficient resources are not available to support the new lease; and
if the another set of non-expired lease records retrieved from the central storage device does not include a copy of the new lease record written to the central storage device: i) remaining in the pending active state of operation until a copy of the new lease record written to the central storage device is retrieved or a predetermined time has passed since entering the pending active state of operation at which time the first device switches to operating in the tampering detected state of operation.

9. A first device comprising:
at least one processor configured to:
determine a number of resources to be used by the first device;
write a first lease record to local storage;
write the first lease record to a central storage device;
operate in an active state of operation in which one or more leased resources are used; and
while operating in the active state of operation:
retrieve a first set of non-expired lease records from the central storage device;
compare one or more lease records in the retrieved first set of non-expired lease records to locally stored lease record information to determine if any of the retrieved lease records for which a local copy exists were altered;
check the retrieved first set of non-expired lease records to determine if the first lease record is missing from the retrieved first set of non-expired lease records; and
if it is determined that the first lease record is missing from the retrieved first set of non-expired lease records: i) write a new lease record to local storage, ii) write the new lease record to the central storage device, and iii) transition to a pending active state of operation; and
memory coupled to said at least one processor.

10. The first device of claim 9, wherein said first lease record identifies the first device, indicates the number of resources to be used by the first device, and indicates a time period in which a first lease is to be valid.

11. The first device of claim 10, wherein said processor is further configured to, while operating in said active state of operation:
determine if, based on the retrieved first set of non-expired lease records and the number of resources to be used, there are sufficient resources available to support a first new lease; and
when it is determined that there are resources available to support the first new lease: i) writing the first new lease to the local storage, ii) writing the first new lease to the central storage device; and iii) remaining in the active state of operation; and
when it is determined that there will not be sufficient resources available to support the first new lease: i) writing the first new lease to the local storage, ii) writing the first new lease to the central storage device, and iii) entering a pending inactive state of operation.

12. The first device of claim 11, wherein said processor is further configured to, while operating in said pending inactive state of operation:
retrieve a second set of non-expired lease records from the centralized storage device;
check to determine if, based on the retrieved second set of non-expired lease information and the number of resources to be used, there are sufficient resources available to support a second new lease; and
when it is determined that there are sufficient resources available to support the second new lease: i) writing the second new lease to the local storage, ii) writing the second new lease to the central storage device, and iii) transitioning to the active state of operation; and
when it is determined that there are not sufficient resources available to support the second new lease: i) deleting a currently stored lease for the first device in local memory and ii) entering an inactive state of operation in which resources which were sought to be leased are not used.

13. The first device of claim 11, wherein said processor is further configured to, while operating in said pending inactive state of operation:
retrieve a second set of non-expired lease records from the centralized storage device;
check the retrieved second set of non-expired lease records to determine if a lease which was recently written by the first device to the central storage device is included in the retrieved second set of non-expired lease records; and
if it is determined that the recently written lease is missing from the retrieved second set of non-expired lease records: i) writing a second new lease to the local storage, ii) writing the second new lease to the central storage device, and iii) transitioning to the pending active state of operation.

14. The first device of claim 12, wherein said processor is further configured to, while operating in said pending inactive state of operation:
retrieve a third set of non-expired lease records from the centralized storage device; and
determine if, based on the retrieved third set of non-expired lease records and the number of resources to be used, sufficient resources available to support a third new lease; and when it is determined that there are sufficient resources available to support the third new lease: i) write the third new lease to local storage, ii) write the third new lease to the central storage device, and iii) transitioning to the active state of operation; and when it is determined that there are insufficient resources available to support the third new lease, remain in the inactive state of operation without writing a new lease to the central storage device.

15. The first device of claim 9, wherein said processor is further configured to:

transition into a tampering detected state of operation, when said comparing determines that one or more lease records for which a local copy exists were altered.

16. The first device of claim 9, wherein said processor is further configured to, while operating in the pending active state of operation:

continue to use leased resources;

retrieve another set of non-expired lease records from the central storage device; and check if the another set of non-expired lease records retrieved from the central storage device includes a copy of the new lease record written to the central storage device; and if the another set of non-expired lease records retrieved from the central storage device includes a copy of the new lease record written to the central storage device: i) switch to the active state of operation if sufficient resources are available to support a new lease and ii) switch to a pending inactive state of operation if sufficient resources are not available to support the new lease; and if the another set of non-expired lease records retrieved from the central storage device does not include a copy of the new lease written to the central storage device: i) remain in the pending active state of operation until a copy of the new lease written to the central storage device is retrieved or a predetermined time has passed since entering the pending active state of operation at which time the first device switches to operating in the tampering detected state of operation.

17. A computer program product for use in a computer, the computer program product comprising:

a non-transitory computer readable medium comprising:

code for causing said computer to determine a number of resources to be used by a first device;

code for causing said computer to write a first lease record to local storage;

code for causing said computer to write the first lease record to a central storage device;

code for causing said computer to operate in an active state of operation in which one or more leased resources are used;

code for causing said computer to retrieve a first set of non-expired lease records from central storage device, while operating in the active state of operation;

code for causing said computer to compare one or more lease records in the retrieved first set of non-expired lease records to locally stored lease record information to determine if any of the retrieved lease records for which a local copy exists were altered, while operating in the active state of operation;

code for causing said computer to check the retrieved first set of non-expired lease records to determine if the first lease record is missing from the retrieved first set of non-expired lease records; and code for causing said computer to: i) write a new lease record to local storage, ii) write the new lease record to the central storage device, and iii) transition to a pending state of operation, if it is determined that the first lease is missing from the retrieved first set of non-expired lease records.

18. The computer program product of claim 17, wherein said first lease record identifies the first device, indicates the number of resources to be used by the first device, and indicates a time period in which a first lease is to be valid.

* * * * *